United States Patent [19]

Hosoe et al.

[11] Patent Number: 5,723,198
[45] Date of Patent: Mar. 3, 1998

[54] MULTI-LAYERED MAGNETIC RECORDING MEDIUM AND MAGNETIC RECORDING SYSTEM EMPLOYING THE SAME

[75] Inventors: Yuzuru Hosoe, Hino; Yoshihiro Shiroishi, Hachioji, both of Japan; Akira Ishikawa, Menlo Park, Calif.; Futoshi Tomiyama, Hachioji, Japan; Kazuetsu Yoshida, Kodaira, Japan; Tomoo Yamamoto, Hachioji, Japan; Yotsuo Yahisa; Akira Osaki, both of Odawara, Japan; Katsuo Abe, Hiratsuka, Japan; Shinji Narishige, Kanagawa-ken, Japan; Naoki Kodama, Kamakura, Japan; Kiwamu Tanahashi, Musashino, Japan; Emi Mangyo, Kokubunji, Japan

[73] Assignee: Hitachi, Ltd., Tokyo, Japan

[21] Appl. No.: 258,923

[22] Filed: Jun. 13, 1994

[30] Foreign Application Priority Data

Jun. 11, 1993 [JP] Japan ................. 5-140351
Sep. 10, 1993 [JP] Japan ................. 5-225439

[51] Int. Cl.$^6$ ....................................... G11B 5/66
[52] U.S. Cl. ................. 428/141; 428/336; 428/694 T; 428/694 TS; 428/694 TP; 428/694 TR; 428/694 TM; 428/900; 428/212; 360/107; 360/113; 360/128; 360/135
[58] Field of Search ............... 428/694 T, 694 TS, 428/694 TP, 694 TR, 694 TM, 900, 141, 212, 336; 360/107, 113, 128, 135

[56] References Cited

U.S. PATENT DOCUMENTS 3,864,751 2/1975 Beaulieu et al. ............... 360/113
3,908,194 9/1975 Romankiw ..................... 360/113

(List continued on next page.)

FOREIGN PATENT DOCUMENTS 51-44917 4/1976 Japan.

(List continued on next page.)

OTHER PUBLICATIONS

Physical Review Letters, vol. 61, No., Nov. 1988, "Gian Magnetoresistance of (001)Fe/(001)Cr Magnetic Superlattices", Baibich et al., pp. 2472–2475.

(List continued on next page.)

Primary Examiner—Leszek Kiliman
Attorney, Agent, or Firm—Fay, Sharpe, Beall, Fagan, Minnich & McKee

[57] ABSTRACT

In a magnetic recording system including magnetic recording media, a rotation driving unit for driving these magnetic recording media, read/write magnetic heads, driving apparatus for driving these read/write magnetic heads, and a read/write signal processing apparatus, a reading portion of the respective magnetic heads is arranged by a magnetoresistive head. The magnetic recording media are constructed of multi-layered magnetic media having a plurality of magnetic layers fabricated directly, or via underlayers on a non-magnetic disk substrate, and of non-magnetic intermediate layers arranged among these non-magnetic layers. Furthermore, one coercivity which is measured by applying a magnetic field along a circumferential direction of the magnetic recording media, is selected to be larger than the other coercivity which is measured by applying a magnetic field along a radial direction of the magnetic recording media, so that a higher signal-to-noise ratio is achieved, as compared with that of the conventional magnetic recording system. Since the thickness of the non-magnetic intermediate layers is smaller than or equal to 5 nm, and also the total layer is smaller than or equal to 5 nm, and also the total layer number of the plural magnetic layers is selected to be odd, better characteristics can be achieved. Accordingly, since the MTBF (Mean Time Before Failure) is longer than or equal to 0.15 million hours with high recording density, and the disk substrate and the magnetic head sliders can be mounted at high packaging density, a compact and high-capacity magnetic recording system can be obtained.

94 Claims, 13 Drawing Sheets

U.S. PATENT DOCUMENTS

| | | | |
|---|---|---|---|
| 4,438,066 | 3/1984 | Aboaf et al. | 420/435 |
| 4,610,911 | 9/1986 | Opfer et al. | 428/213 |
| 4,663,685 | 5/1987 | Tsang | 360/113 |
| 4,713,708 | 12/1987 | Krounbi et al. | 360/113 |
| 4,735,840 | 4/1988 | Hedgcoth | 428/65.5 |
| 5,605,733 | 2/1997 | Ishikowe | 428/65.3 |

FOREIGN PATENT DOCUMENTS

| | | |
|---|---|---|
| 58-7806 | 1/1983 | Japan . |
| 60-111323 | 6/1985 | Japan . |
| 61-29418 | 2/1986 | Japan . |
| 62-40610 | 2/1987 | Japan . |
| 62-146434 | 6/1987 | Japan . |
| 63-117309 | 5/1988 | Japan . |
| 63-121123 | 5/1988 | Japan . |
| 63-146219 | 6/1988 | Japan . |

OTHER PUBLICATIONS

Physical Review B, Vol. 43, No. 1, Jan. 1991, "Giant Magnetiresistance in Soft Ferromagnetic Multilayers", Dieny et al, pp. 1297–1300.

IEEE Transactions on Magnetics, Vol. MAG–22, No. 5, Sep. 1986, "Anisotropy Induced Signal Waveform Modulation of DC Magnetron Sputtered Thin Film Disks" E. Teng et al, pp. 579–581.

IEEE Transactions on Magnetics, vol. Mag–23, No. 5, Sep. 1987, "Effect of Circumferential Texture on the Properties of Thin Film Rigid Recording Disks" E.M. Simpson et al, pp. 3405–3407.

JIS B 0601–1982.

DISK ROTATING DIRECTION

DISK ROTATING DIRECTION    h: HEAD FLYING HEIGHT

MULTI-LAYERED MAGNETIC RECORDING MEDIUM AND MAGNETIC RECORDING SYSTEM EMPLOYING THE SAME

BACKGROUND OF THE INVENTION

The present invention generally relates to a magnetic recording system used in an auxiliary recording apparatus of a computer, and also to a magnetic recording medium employed in such a magnetic recording system. More specifically, the present invention is directed to a magnetic recording system having a high recording density of more than 600 Megabits per 1 $inch^2$, and also to a thin-film magnetic recording medium suitable for realizing such high recording density.

In accordance with the great progress of an information-oriented society, amounts of information usually processed in this information-oriented society are continuously increased. Under such circumstances, strong demands for higher recording density and higher recording capacity are made to magnetic recording systems. When recording density of a magnetic disk system is considerably increased, the number of recorded bits per area of a recording medium is increased, so that a read output is lowered. Thus, a read or playback operation of written data becomes difficult. To solve such problems, one solution has been proposed, as described in JP-A-51-44917, JP-A-62-40610, and JP-A-63-117309, such that two separate magnetic heads are employed to perform the read/write operations, and the magnetic head utilizing the magnetoresistive effect is utilized as the reading magnetic head. To the contrary, the read/write operations are carried out by employing a single inductive head in one convention magnetic recording system. As this magnetoresistive read head owns a higher efficiency, it is suitable to realize high density recording. In a magnetoresistive head, a read output is obtained by utilizing a resistance change caused by variation of a magnetizing direction of a magnetoresistive layer with a current flowing direction. Further, as described in U.S. Pat. No. 3,864,751, the soft magnetic film biasing layer is formed via the on-magnetic spacer layer on the above-explained magnetoresistive layer so as to improve response linearity with regard to the magnetic field. Basically, what such a magnetic resistance change is induced is the single layer of the soft magnetic layer (namely, magnetoresistive layer). The magnitude of this resistance changing rate is normally on the order of several percent.

To the contrary, very recently, the below-mentioned report has been made that very large magnetic resistance changes reaching several tens % at maximum could be made by such a type of magnetic film that a plurality of magnetic layers are stacked via the non-magnetic layers (see Physical Review Letters, Vol. 61, pages 2472 to 2475 issued in 1988, and Physical Review B, Vol. 43, pages 1297 to 1300 issued in 1991). However, since the magnetizing directions of the respective magnetic layers stacked with each other are not always coincident with each other, the relative direction is changed due to the external magnetic fields, resulting in a great resistance change. Such a large magnetoresistive effect occurred in this type of multi-layered magnetic thin film is referred to either as a "spin-valve effect", or a "great magnetoresistive effect". Now, the development of the magnetoresistive read head having higher efficiencies is being performed by utilizing this effect.

At the beginning, as the recording media employed in the magnetic disk apparatuses, coated media in which powder of the magnetic material oxides were coated on the substrate had been utilized. Recently, thin-film media in which the thin film of the metal magnetic material is sputter-vapor-deposited on the substrate, have been developed. For instance, as described in JP-A-58-7806 and JP-A-60-111323, since the density of the magnetic material contained in the magnetic recording layer of this thin-film medium is higher than that of the other conventional coated medium, such a thin-film medium is suitable to the read/write operation at high recording density. On the other hand, another multi-layered magnetic recording medium has been proposed in JP-A-63-146219 such that the magnetic recording layer of the thin-film medium is constituted by a plurality of magnetic layers, and the non-magnetic intermediate layers are interposed among the respective magnetic layers, thereby reducing the magnetic coupling among the respective magnetic layers. As a consequence, noise caused by the thin-film media is lowered.

As the substrate of this thin-film medium, an aluminum alloy, glass, ceramics, or organic resin is utilized. To improve either the mechanical forming or the magnetic characteristic such as hardness and smoothing degrees, either the Ni—P plated layer, or the anodic oxide layer, which has a thickness of, for instance, approximately 10 micrometers, is formed on the surface of the disk substrate.

There are some possibilities that very small grooves are formed on such a substrate surface along a direction substantially equal to the traveling direction of the magnetic head (namely, circumferential direction of magnetic disk). These very small grooves are described in U.S. Pat. No. 4,735,840, JP-A-61-29418, JP-A-62-146434, JP-A-63-121123, IEEE TRANSACTION on MAGNETICS MAG-Vol. 22, pages 579, issued in 1986, IEEE TRANSACTION on MAGNETICS MAG-Vol. 23, page 3405, issued in 1987. These very small grooves are referred to as "texture", and are formed by cutting a surface of a substrate along the circumferential direction of a magnetic disk by employing an abrasive grain. Conventionally, an average roughness factor of a groove is within a range between approximately 3 and 10 nm. Given such a texture, the frictional force produced when the magnetic head is in contact with the medium is decreased, so that such a problem that the magnetic head is adhered to the surface of the medium during the contact-start-stop (will be referred to "CSS") operation, can be avoided.

There are some possibilities that the signal-to-noise ratio and resolution during the read/write operations may be increased, since the magnetic characteristics of the magnetic layer measured while applying the magnetic field to this magnetic layer along the traveling direction of the magnetic head, for example, coercivity Hc, residual magnetic flux density Br, or coercivity squareness S* would be changed, with respect to those when such a texture would now be formed, if the average roughness factor of the grooves, the thickness of the underlayer, and the film forming condition of the medium are properly controlled. Furthermore, there is another problem that the magnetic characteristics along the circumferential direction become uneven within the medium surface, depending upon the heating temperatures as well as the transporting manner during the film formation of the medium, and accordingly, the read output is varied within the surface of the medium. This read output variation within the surface of the medium is referred to a "modulation". Since there is a trend that this modulation is increased if the diameter of the disk substrate is smaller than or equal to 3.5 inches, it is required to further improve uniformity of the magnetic characteristics within the magnetic disk, as compared with uniformity of the conventional magnetic characteristics. When the depth of the groove of the texture, the composition of the underlayer, and the film forming condition are properly controlled, the magnetic characteristics along the circumferential direction are made uniform within the surface of the medium. As a result, the modulation may be suppressed.

As previously explained, the magnetoresistive type read heads with higher efficiencies have been developed which are suitable for high density magnetic recording. Since this type of magnetoresistive head owns higher read efficiencies, and also the resistance of this magnetoresistive head is low, thermal noise becomes low. As a consequence, the medium noise caused by the magnetic recording medium, which has been conventionally hidden by the large noise produced from the inductive head, may occupy a substantial ratio of the entire noise of the magnetic recording system. As a consequence, the medium noise should be reduced so as to realize high recording density with employment of the magnetoresistive type magnetic head. The multi-layered magnetic recording medium constructed of a plurality of magnetic layers into which the non-magnetic intermediate layers have been inserted has been proposed as method for reducing the medium noise. Accordingly, the high-density magnetic disk apparatus may be expected by combining the magnetoresistive read head with such a multi-layered magnetic recording medium.

However, a magnetic disk apparatus combined with the magnetoresistive head and multi-layered magnetic recording medium suffers from uneven read output at high density within the disk surface, greatly lowered read output, and insufficient S/N ratio, as compared with those of another conventional magnetic recording medium whose magnetic layer is singular (namely, a magnetic recording medium with a singular magnetic layer).

As previously described, although the read head with high efficiency and the low-noise magnetic recording medium have been separately developed, no specific consideration has been made as to how to realize the magnetic disk apparatus having such high recording density by combining these items. In particular, the above-described problems become remarkable when the thickness of the substrate is smaller than or equal to 0.6 mm. Also, there are problems that when the below-mentioned substrates are utilized, crystal orientation characteristics of the magnetic layer of the recording medium fluctuates, the characteristics are uneven, and substantially higher read output is not produced. That is, there are employed as the substrate, surface-reinforced crystal glass having good smoothing characteristics and which is capable of stably floating the magnetic head at a low height; glass; a ceramics substrate such as Si—C; a non-metal substrate such as Si and carbon; and a substrate whose surface is non-magnetic such as Ti oxide.

Moreover, there is a further problem that the overwrite characteristic of the multi-layered magnetic recording medium is deteriorated.

SUMMARY OF THE INVENTION

An object of the present invention is to solve the above-described objects, and to provide a highly reliable magnetic recording system capable of reading/writing information under high density.

The above-described object may be achieved by a magnetic recording system comprising: a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head, a read portion of said magnetic head arranged by a magnetoresistive head;

wherein said magnetic recording medium is arranged by a multi-layered magnetic recording medium having a plurality of magnetic layers either directly, or via an underlayer on a non-magnetic substrate, and non-magnetic intermediate layers among said plural magnetic layers; and further both of coercivity Hc(θ) of said magnetic recording medium, which is measured by applying a magnetic field along a circumferential direction (a relative traveling direction of a magnetic recording medium during a writing operation) and coercivity Hc(r) of said magnetic recording medium, which is measured by applying a magnetic field along a radial direction of said recording medium, are set to a range for satisfying the following relationship (1):

$$0.05 \leq \{Hc(\theta) - Hc(r)\}/\{Hc(\theta) + Hc(r)\} \leq 0.6 \tag{1}$$

Also, a magnetic recording medium capable of satisfying the above-explained relationship (1) and having a better/stable head floating characteristic may be provided by setting such conditions that a range of an average roughness factor of the surface of this magnetic recording medium, which has been measured along a direction substantially perpendicular to the traveling direction of the magnetic head, is higher than or equal to 0.1 nm, and lower than or equal to 5 nm, and furthermore a ratio Ra(r)/Ra(θ) of an average roughness factor Ra(θ) measured along a direction substantially equal to the traveling direction of the magnetic head to an average roughness factor Ra(r) measured along a direction substantially normal to the above-described direction, is selected to be higher than or equal to 1.1 and lower than or equal to 5.0.

It should be noted that the expressions "an average roughness factor" and "a maximum height" refer to the definitions of Japanese Industrial Standards, JIS-B0601. Both the average roughness factor and the maximum height may be measured by way of, for instance, either a needle-touch type surface profiler, or an optical type surface profiler, a scanning tunnel microscope, an atomic force microscope, a 3-dimensional scanning microscope, and a transmission electron microscope. In case that the needle-touch type surface profiler is employed, to obtain a reproducible measuring result, it is preferable that a diameter of a tip portion of the measuring needle is selected to be smaller than or equal to 0.5 micrometers, preferably less than 0.2 micrometers; the depressing weight of the needle is selected to be lower than or equal to 4 mg; the scanning speed of the needle is selected to be lower than or equal to 1 micrometer/sec; and furthermore, cut off is selected to be greater than or equal to 0.5 micrometers and smaller than or equal to 5 micrometers. When a portion of the protective layer has been processed by the etching process and the heating process, the shape of the groove may be measured by scanning the surface of the unprocessed portion by the needle. Further, when the overall surface of the protective layer has been processed, only the protective layer is removed by way of the etching process, so that roughness of the surface of the magnetic layer is measured.

In addition, at least one underlayer made of Cr, Mo, W or an alloy containing these materials as a major component is formed having a thickness from 5 nm to 500 nm on a substrate (substrate). A magnetic layer made of an alloy containing Co as a major intermediate layer made of Cr, Mo, W, or an alloy containing these materials as a major component, are alternately stacked on this underlayer formed on the substrate, so that magnetic anisotropy along the traveling direction of the magnetic head may be improved. In case that a substrate whose surface is made of a non-metal material is employed, when either Zi, Si, Ti, Y, Sc, Al, C, Ge, Sb, Ga, Ru, Pd, V, Nb, Hf, Rh, Ni—P, or an alloy layer containing these materials as a major component is provided between the substrate and the underlayer, better magnetic characteristics are obtained.

When the film thickness of the non-magnetic intermediate layer is selected to be greater than or equal to 0.1 nm, and smaller than or equal to 5 nm, the overwrite characteristic are improved. When the layer quantity of the magnetic layers is selected to be an odd number, a higher S/N ratio is achieved than that of the magnetic layers having an even number of layers.

When the coercivity Hc measured by applying the magnetic field along the traveling direction of the magnetic head is selected to be higher than or equal to 1,400 Oersteds, and also the product (Br×t) between the residual magnetic flux density and the total thickness of the magnetic layers is selected to be in a range between 30 and 280 gauss micrometers, the ratio (resolution) of the read output obtained by performing the read/write operation in lower linear recording density to the read output obtained by performing the read/write operation in higher linear recording density is increased. When a plurality of magnetic layers of the above-described magnetic recording medium are arranged by employing at least one magnetic layer having one composition and other magnetic layers having different compositions from that of the first-mentioned magnetic layer, better read/write characteristics with a higher layer recording density of greater than 100 kFCI can be obtained. When the Ar concentration contained in the above-described underlayer, magnetic layer, and non-magnetic intermediate layer is selected to be lower than or equal to 2.0 atom % (at %), preferably 1.0 at %, the magnetic anisotropy along the traveling direction of the magnetic head is improved. Furthermore, when the height of the magnetic slider is lower than or equal to 0.5 mm, and also the thickness of the non-magnetic substrate is selected to be smaller than or equal to be 0.6 mm, both the magnetic head and the magnetic recording medium can be mounted within the magnetic recording system at high density.

A feature of the first embodiment of the invention is a multilayered magnetic recording medium comprising: a non-magnetic substrate; a plurality of magnetic layers directly formed on the non-magnetic substrate, or formed via underlayers on the non-magnetic substrate; and a non-magnetic intermediate layer arranged between said plural magnetic layers; wherein:

the coercivity $Hc(\theta)$ of said multi-layered magnetic recording medium, which is measured by applying a magnetic field along a direction substantially parallel to a relative traveling direction of a magnetic head with respect to said magnetic recording medium during a writing operation, is greater than the coercivity $Hc(r)$ of said multi-layered magnetic recording medium, which is measured by applying a magnetic field along a direction substantially perpendicular to the relative traveling direction of said magnetic head within surfaces of said multi-layered recording medium.

A feature of the second embodiment of the invention is that the coercivity $Hc(\theta)$ of the first embodiment, measured by applying the magnetic field along the direction substantially parallel to the relative traveling direction of the magnetic head, is greater than or equal to 1,400 Oersteds.

A feature of the third embodiment of the invention is that the underlayers and said non-magnetic intermediate layer of the first embodiment are constructed of layers containing Cr, Mo, or W as a major component, and said magnetic layer is constructed of an alloy layer containing Co as a major component.

A feature of the fourth embodiment of the invention is that the Ar concentration contained in said underlayers, magnetic layers, and non-magnetic intermediate layer of the first embodiment is lower than or equal to 2.0 at %.

A feature of the fifth embodiment of the invention is that a composition of at least one magnetic layer among said plurality of magnetic layers of the first embodiment is different from compositions of other magnetic layers.

A feature of the sixth embodiment of the invention is that the Co concentration of at least one magnetic layer among said plurality of magnetic layers of the first embodiment is different from the Co concentration of other magnetic layers.

A feature of the seventh embodiment of the invention is that the underlayers of the first embodiment are constructed of at least two non-magnetic layers, and one underlayer positioned on the side of said non-magnetic substrate is made of either Zr, Si, Ti, Y, Sc, Al, C, Ge, Sb, Ga, Ru, Pd, V, Nb, Hf, Rh, Ni—P, or an alloy layer containing these materials as a major component.

A feature of the eighth embodiment of the invention is that the non-magnetic substrate of the first embodiment is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the ninth embodiment of the invention is a multi-layered magnetic recording medium comprising: a non-magnetic substrate; a plurality of magnetic layers directly formed on the non-magnetic substrate, or formed via underlayers on the non-magnetic substrate; and a non-magnetic intermediate layer arranged between said plural magnetic layers; wherein:

both the coercivity $Hc(\theta)$ of said multi-layered magnetic recording medium, which is measured by applying a magnetic field along a direction substantially parallel to a relative traveling direction of a magnetic head with respect to said magnetic recording medium during a writing operation, and the coercivity $Hc(r)$ of said multi-layered magnetic recording medium, which is measured by applying a magnetic field along a direction substantially perpendicular to the relative traveling direction of said magnetic head within surfaces of said multi-layered recording medium, are within a range for satisfying the following relationship:

$$0.05 \leq \{Hc(\theta) - Hc(r)\}/\{Hc(\theta) + Hc(r)\} \leq 0.6$$

A feature of the tenth embodiment of the invention is that the coercivity $Hc(\theta)$ of the ninth embodiment measured by applying the magnetic field along the direction substantially parallel to the relative traveling direction of the magnetic head is greater than or equal to 1,400 Oersteds.

A feature of the eleventh embodiment of the invention is that the underlayers and said non-magnetic intermediate layer of the ninth embodiment are constructed of layers containing Cr, Mo, or W as a major component, and said magnetic layer is constructed of an alloy layer containing Co as a major component.

A feature of the 12th embodiment of the invention is that the Ar concentration contained in said underlayers, magnetic layers, and non-magnetic intermediate layer of the ninth embodiment is lower than or equal to 2.0 at %.

A feature of the 13th embodiment of the invention is that a composition of at least one magnetic layer among said plurality of magnetic layers of the ninth embodiment is different from compositions of other magnetic layers.

A feature of the 14th embodiment of the invention is that the Co concentration of at least one magnetic layer among said plurality of magnetic layers of the ninth embodiment is different from Co concentration of other magnetic layers.

A feature of the 15th embodiment of the invention is that the underlayers of the ninth embodiment are constructed of at least two non-magnetic layers, and one underlayer positioned on the side of said non-magnetic substrate is made of either Zr, Si, Ti, Y, Sc, Al, C, Ge, Sb, Ga, Ru, Pd, V, Nb, Hf, Rh, Ni—P, or an alloy layer containing these materials as a major component.

A feature of the 16th embodiment of the invention is that the non-magnetic substrate of the ninth embodiment is an Al alloy on which surface, Ni—P has been plated; surface-reinforced glass; glass; crystallized glass; Ti; carbon; Si—C; Si; glass-coated crystallized glass; ceramics; or glass-coated ceramics.

A feature of the 17th embodiment of the invention is a multi-layered magnetic recording medium comprising: a non-magnetic substrate; a plurality of magnetic layers directly formed on the non-magnetic substrate, or formed via underlayers on the non-magnetic substrate; and a non-magnetic intermediate layer arranged between said plural magnetic layers; wherein:

an average roughness factor Ra(r) of a surface of said magnetic recording medium, which is measured along a direction substantially normal to a relative traveling direction of a magnetic head with respect to said magnetic recording medium during a writing operation, is greater than or equal to 0.1 nm and smaller than or equal to 5 nm, and also a ratio of said average roughness factor Ra(r) to another average roughness factor Ra(θ) of the surface of the magnetic recording medium, which is measured along a direction substantially parallel to said relative traveling direction of said magnetic head (namely, Ra(r)/Ra(θ)) is greater than or equal to 1.1 and smaller than or equal to 5.0.

A feature of the 18th embodiment of the invention is that the coercivity Hc(θ) of the 17th embodiment measured by applying the magnetic field along the direction substantially parallel to the relative traveling direction of the magnetic head is greater than or equal to 1,400 Oersteds.

A feature of the 19th embodiment of the invention is that the underlayers and said non-magnetic intermediate layer of the 17th embodiment are constructed of layers containing Cr, Mo, or W as a major component, and said magnetic layer is constructed of an alloy layer containing Co as a major component.

A feature of the 20th embodiment of the invention is that the Ar concentration contained in said underlayers, magnetic layers, and non-magnetic intermediate layer of the 17th embodiment is lower than or equal to 2.0 at %.

A feature of the 21st embodiment of the invention is that a composition of at least one magnetic layer among said plurality of magnetic layers of the 17th embodiment is different from compositions of other magnetic layers.

A feature of the 22nd embodiment of the invention is that the Co concentration of at least one magnetic layer among said plurality of magnetic layers of the 17th embodiment is different from the Co concentration of other magnetic layers.

A feature of the 23rd embodiment of the invention is that the underlayers of the 17th embodiment are constructed of at least two non-magnetic layers, and one underlayer positioned on the side of said non-magnetic substrate is made of either Zr, Si, Ti, Sc, Al, C, Ge, Sb, Ga, Ru, Pd, V, Nb, Hf, Rh, Ni—P, or an alloy layer containing these materials as a major component.

A feature of the 24th embodiment of the invention is that the non-magnetic substrate is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 25th embodiment of the invention is a multi-layered magnetic recording medium comprising: a non-magnetic substrate; a plurality of magnetic layers directly formed on the non-magnetic substrate, or formed via underlayers on the non-magnetic substrate; and a non-magnetic intermediate layer arranged between said plural magnetic layers; wherein:

a product (Br×t) between the total thickness (t) of said plurality of magnetic layers and the residual magnetic flux density, which is measured by applying a magnetic field along a direction substantially parallel to a relative traveling direction of a magnetic head with respect to said magnetic recording medium during a writing operation, is greater than or equal to 30 gauss micrometers, and smaller than or equal to 280 gauss micrometers.

A feature of the 26th embodiment of the invention is that the coercivity Hc(θ) of the 25th embodiment measured by applying the magnetic field along the direction substantially parallel to the relative traveling direction of the magnetic head is greater than or equal to 1,400 Oersteds.

A feature of the 27th embodiment of the invention is that said underlayers and said non-magnetic intermediate layer of the 25th embodiment are constructed of layers containing Cr, Mo, or W as a major component, and said magnetic layer is constructed of an alloy layer containing Co as a major component.

A feature of the 28th embodiment of the invention is that the Ar concentration contained in said underlayers, magnetic layers, and non-magnetic intermediate layer of the 25th embodiment is lower than, or equal to 2.0 at %.

A feature of the 29th embodiment of the invention is that a composition of at least one magnetic layer among said plurality of magnetic layers of the 25th embodiment is different from compositions of other magnetic layers.

A feature of the 30th embodiment of the invention is that the Co concentration of at least one magnetic layer among said plurality of magnetic layers of the 25th embodiment is different from the Co concentration of other magnetic layers.

A feature of the 31st embodiment of the invention is that said underlayers of the 25th embodiment are constructed of at least two non-magnetic layers, and one underlayer positioned on the side of said non-magnetic substrate is made of either Zr, Si, Ti, Y, Sc, Al, C, Ge, Sb, Ga, Ru, Pd, V, Nb, Hf, Rh, Ni—P, or an alloy layer containing these materials as a major component.

A feature of the 32nd embodiment of the invention is that said non-magnetic substrate is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 33rd embodiment of the present invention is a magnetic recording system comprising: a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head; wherein:

said magnetic recording medium is arranged by a multi-layered magnetic recording medium having a plurality of magnetic layers either directly, or via at least a single underlayer on a non-magnetic substrate, and non-magnetic intermediate layers among said plural magnetic layers; and further the coercivity Hc(θ) of said multi-layered magnetic recording medium, which is measured by applying a magnetic field along a direction substantially parallel to a relative traveling direction of a magnetic head with respect to said magnetic recording medium during a writing operation, is greater than the coercivity Hc(r) of said multi-layered magnetic recording medium, which is measured by applying a magnetic field along a direction substantially perpendicular to the relative traveling direction of said magnetic head within surfaces of said multi-layered recording medium.

A feature of the 24th embodiment of the invention is that said read back portion of said magnetic head of the 33rd embodiment is arranged by a magnetoresistive sensor having a plurality of conductive magnetic layers and conductive non-magnetic layers positioned among said plurality of conductive magnetic layers, and resistances of said conductive magnetic layers are greatly changed when mutual magnetizing directions are relatively varied by an external magnetic field.

A feature of the 35th embodiment of the invention is that the coercivity Hc(θ) of the 33rd embodiment measured by applying the magnetic field along the direction substantially parallel to the relative traveling direction of the magnetic head is greater than or equal to 1,400 Oersteds.

A feature of the 36th embodiment of the invention is that said underlayer adjacent to the magnetic layer of said magnetic head and said non-magnetic intermediate layer of the 33rd embodiment are constructed of layers containing Cr, Mo, or W as a major component, and aid magnetic layer is constructed of an alloy layer containing Co as a major component.

A feature of the 37th embodiment of the invention is that the Ar concentration contained in said underlayer, magnetic layers, and non-magnetic intermediate layer of the 33rd embodiment is lower than or equal to 2.0 at %.

A feature of the 38th embodiment of the invention is that said underlayer of said magnetic recording medium of the 33rd embodiment is constructed of at least two non-magnetic layers, and one underlayer positioned on the side of said non-magnetic substrate is made of either Zr, Si, Ti, Y, Sc, Al, C, Ge, Sb, Ga, Ru, Pd, V, Nb, Hf, Rh, Ni—P, or an alloy layer containing these materials as a major component.

A feature of the 39th embodiment of the invention is that a height o a magnetic head slider for holding said magnetic head and for floating said magnetic head with respect to said magnetic recording medium according to the 33rd embodiment is smaller than or equal to 0.5 mm, and a thickness of said substrate is smaller than or equal to 0.6 mm.

A feature of the 40th embodiment of the invention is that either the linear recording density of said magnetic recording medium according to the 33rd embodiment is higher than or equal to 100 kFCI, or the recording track density of said magnetic recording medium is higher than or equal to 4 kTPI.

A feature of the 41st embodiment of the invention is that said non-magnetic substrate of the 33rd embodiment is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 42nd embodiment of the invention is a magnetic recording system comprising: a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head; wherein:

a read back portion of said magnetic head is arranged by a magnetoresistive head;

said magnetic recording medium is arranged by a multi-layered magnetic recording medium having a plurality of magnetic layers either directly, or via at least a single underlayer on a non-magnetic substrate, and non-magnetic intermediate layers among said plural magnetic layers; and further the coercivity Hc(θ) of said magnetic recording medium, which is measured by applying a magnetic field along a direction substantially parallel to a relative traveling direction of a magnetic head with respect to said magnetic recording medium during a writing operation, is greater than the coercivity Hc(r) of said multi-layered magnetic recording medium, which is measured by applying a magnetic field along a direction substantially perpendicular to the relative traveling direction of said magnetic head within surfaces of said multi-layered recording medium.

A feature of the 43rd embodiment of the invention is that said read back portion of said magnetic head of the 42nd embodiment is arranged by a magnetoresistive sensor having a plurality of conductive magnetic layers and conductive non-magnetic layers positioned among said plurality of conductive magnetic layers, and resistances of said conductive magnetic layers are greatly changed when mutual magnetizing directions are relatively varied by an external magnetic field.

A feature of the 44th embodiment of the invention is that the coercivity Hc(θ) of the 42nd embodiment measured by applying the magnetic field along the direction substantially parallel to the relative traveling direction of the magnetic head is greater than or equal to 1,400 Oersteds.

A feature of the 45th embodiment of the invention is that said underlayer adjacent to the magnetic layer of said magnetic recording medium of the 42nd embodiment, and said non-magnetic intermediate layer are constructed of layers containing Cr, Mo, or W as a major component, and said magnetic layer is constructed of an alloy layer containing Co as a major component.

A feature of the 46th embodiment of the invention is that the Ar concentration contained in said underlayer, magnetic layers, and non-magnetic intermediate layer of the 42nd embodiment is lower than or equal to 2.0 at %.

A feature of the 47th embodiment of the invention is that said underlayer of said magnetic recording medium according to the 42nd embodiment is constructed of a least two non-magnetic layers, and one underlayer positioned on the side of said non-magnetic substrate is made of either Ar, Si, Ti, Y, Sc, Al, C, Ge, Sb, Ga, Ru, Pd, V, Nb, Hf, Rh, Ni—P, or an alloy layer containing these materials as a major component.

A feature of the 48th embodiment of the invention is that a height of a magnetic head slider for holding said magnetic head according to the 42nd embodiment and for floating said magnetic head with respect to said magnetic recording medium is smaller than or equal to 0.5 mm, and a thickness of said substrate is smaller than or equal to 0.6 mm.

A feature of the 49th embodiment of the invention is that either the linear recording density of said magnetic recording medium of the 42nd embodiment is higher than, or equal to 100 kFCI, or the recording track density of said magnetic recording medium is higher than or equal to 4 kTPI.

A feature of the 50th embodiment of the invention is that said non-magnetic substrate of the 42nd embodiment is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 51st embodiment of the invention is a magnetic recording system comprising: a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head; wherein:

a read back portion of said magnetic head is arranged by a magnetoresistive head;

said magnetic recording medium is arranged by a multi-layered magnetic recording medium having a plurality of magnetic layers either directly, or via at least a single underlayer on a non-magnetic substrate, and non-magnetic intermediate layers among said plural magnetic layers; and further both of the coercivity Hc(θ) of said magnetic recording medium, which is measured by applying a magnetic field along a direction substantially parallel to a relative traveling direction of a magnetic recording medium during a writing operation and the coercivity Hc(r) of said multi-layered magnetic recording medium, which is measured by applying a magnetic field along a direction substantially perpendicular to the relative traveling direction of said magnetic head within surfaces of said multi-layered recording medium are in a range for satisfying the following relationship:

$$0.05 \leq \{Hc(\theta)-Hc(r)\}/\{Hc(\theta)+Hc(r)\} \leq 0.6$$

A feature of the 52nd embodiment of the invention is that said read back portion of said magnetic head of the 51st embodiment is arranged by a magnetoresistive sensor having a plurality of conductive magnetic layers and conductive non-magnetic layers positioned among said plurality of conductive magnetic layers, and resistances of said conductive magnetic layers are greatly changed when mutual magnetizing directions are relatively varied by an external magnetic field.

A feature of the 53rd embodiment of the invention is that the coercivity Hc(θ) of the 51st embodiment measured by applying the magnetic field along the direction substantially parallel to the relative traveling direction of the magnetic head is greater than or equal to 1,400 Oersteds.

A feature of the 54th embodiment of the invention is that said underlayer adjacent to the magnetic layer of said magnetic recording medium, and said non-magnetic intermediate layer are constructed of layers containing Cr, Mo, or W as a major component, and said magnetic layer is constructed of an alloy layer containing Co as a major component.

A feature of the 55th embodiment of the invention is that the Ar concentration contained in said underlayers, magnetic layers, and non-magnetic intermediate layer of the 51st embodiment is lower than or equal to 2.0 at %.

A feature of the 56th embodiment of the invention is that said underlayer of said magnetic recording medium of the 51st embodiment is constructed of at least two non-magnetic layers, and one underlayer positioned on the side of said non-magnetic substrate is made of either Ar, Si, Ti, Y, Sc, Al, C, Ge, Sb, Ga, Ru, Pd, V, Nb, Hf, Rh, Ni—P, or an alloy layer containing these materials as a major component.

A feature of the 57th embodiment of the invention is that a height of a magnetic head slider for holding said magnetic head according to the 51st embodiment, and for floating said magnetic head with respect to said magnetic recording medium, is smaller than or equal to 0.5 mm, and a thickness of said substrate is smaller than or equal to 0.6 mm.

A feature of the 58th embodiment of the invention is that either the linear recording density of said magnetic recording medium is higher than or equal to 4 kTPI.

A feature of the 59th embodiment of the invention is that said non-magnetic substrate is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 60th embodiment of the invention is a magnetic recording system comprising; a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head; wherein:

a read back portion of said magnetic head is arranged by a magnetoresistive head;

said magnetic recording medium is arranged by a multi-layered magnetic recording medium having a plurality of magnetic layers either directly, or via at least a single underlayer on a non-magnetic substrate, and non-magnetic intermediate layers among said plural magnetic layers; and an average roughness factor Ra(r) of a surface of said magnetic recording medium, which is measured along a direction substantially perpendicular to a relative traveling direction of said magnetic head with respect to said magnetic recording medium during a writing operation, is higher than or equal to 0.1 nm and smaller than or equal to 5 nm; and further a ratio of said average roughness factor Ra(r) to another average roughness factor Ra(θ) of the surface of said magnetic recording medium, which is measured along a direction substantially parallel to said relative traveling direction of said magnetic head, is higher than or equal to 1.1, and smaller than or equal to 5.0.

A feature of the 61st embodiment of the invention is that said read back portion of said magnetic head of the 60th embodiment is arranged by a magnetoresistive sensor having a plurality of conductive non-magnetic layers positioned among said plurality of conductive magnetic layers, and resistances of said conductive magnetic layers are greatly changed when mutual magnetizing directions are relatively varied by an external magnetic field.

A feature of the 62nd embodiment of the invention is that the coercivity Hc(θ) measured by applying the magnetic field along the direction substantially parallel to the relative traveling direction of the magnetic head is greater than or equal to 1,400 Oersteds.

A feature of the 63rd embodiment of the invention is that said underlayer adjacent to the magnetic layer of said magnetic recording medium of the 60th embodiment, and said non-magnetic intermediate layer are constructed of layers containing Cr, Mo, or W as a major component, and said magnetic layer is constructed of an alloy layer containing Co as a major component.

A feature o the 64th embodiment of the invention is that the Ar concentration contained in said underlayer, magnetic layers, and non-magnetic intermediate layer of the 60th embodiment lower than or equal to 2.0 at %.

A feature of the 65th embodiment of the invention is that said underlayer of said magnetic recording medium of the 60th embodiment is constructed of at least two non-magnetic layers, and one underlayer positioned on the side of said non-magnetic substrate is made of either Zr, Si, Ti, Y, Sc, Al, C, Ge, Sb, G, Ru, Pd, V, Nb, Hf, Rh, Ni—P, or an alloy layer containing these materials as a major component.

A feature of the 66th embodiment of the invention is that a height of a magnetic head slider for holding said magnetic head according to the 60th embodiment, and for floating said magnetic head with respect to said magnetic recording medium, is smaller than or equal to 0.5 mm, and a thickness of said substrate is smaller than or equal to 0.6 mm.

A feature of the 67th embodiment of the invention is that either the linear recording density of said magnetic recording medium of the 60th embodiment is higher than or equal to 100 kFCI, or the recording track density of said magnetic recording medium is higher than or equal to 4 kTPI.

A feature of the 68th embodiment of the invention is that said non-magnetic substrate of the 60th embodiment is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 69th embodiment of the invention is a magnetic recording system comprising: a magnetic recording medium; a driving unit for driving said magnetic recording medium along a writing direction; a magnetic head constructed of a writing portion and a reading portion; a means for relatively moving said magnetic head with respect to said magnetic recording medium; and a read/write signal processing means for inputting a signal into said magnetic head and for reading back a signal outputted from said magnetic head; wherein:

a read back portion of said magnetic head is arranged by a magnetoresistive head;

said magnetic recording medium is arranged by a multi-layered magnetic recording medium having a plurality of magnetic layers either directly, or via at least a single underlayer on a non-magnetic substrate, and non-magnetic intermediate layers among said plural magnetic layers; and a product (Br×t) between the total thickness (t) of said plurality of magnetic layers of said magnetic recording medium, and the residual magnetic flux density (Br) of said magnetic recording medium, which is measured by applying a magnetic field along a direction substantially parallel to a relative traveling direction of a magnetic head with respect to said magnetic recording medium during a writing operation, is greater than or equal to 30 gauss micrometers, and also is smaller than or equal to 280 gauss micrometers.

A feature of the 70th embodiment of the invention is that said read back portion of said magnetic head of the 69th embodiment is arranged by a magnetoresistive sensor having a plurality of conductive magnetic layers and conductive non-magnetic layers positioned among said plurality of conductive magnetic layers, and resistances of said conductive magnetic layers are greatly changed when mutual magnetizing directions are relatively varied by an external magnetic field.

A feature of the 71st embodiment of the invention is that the coercivity Hc(θ) of the 69th embodiment measured by applying the magnetic field along the direction substantially parallel to the relative traveling direction of the magnetic head is greater than or equal to 1,400 Oersteds.

A feature of the 72nd embodiment of the invention is that said underlayers and said non-magnetic intermediate layer of the 69th embodiment are constructed of layers containing Cr, Mo, or W as a major component, and said magnetic layer is constructed of an alloy layer containing Co as a major component.

A feature of the 73rd embodiment of the invention is that the Ar concentration contained in said underlayers, magnetic layers, and non-magnetic intermediate layer of the 69th embodiment is lower than or equal to 2.0 at %.

A feature of the 74th embodiment of the invention is that said underlayers of the 69th embodiment are constructed of at least two non-magnetic layers, and one underlayer positioned on the side of said non-magnetic substrate is made of either Ar, Si, Ti, Y, Sc, Al, C, Ge, Sb, Ga, Ru, Pd, V, Nb, Hf, Rh, Ni—P, or an alloy layer containing these materials as a major component.

A feature of the 75th embodiment of the invention is that a height of a magnetic head slider for holding said magnetic head according to the 69th embodiment, and for floating said magnetic head with respect to said magnetic recording medium is smaller than or equal to 0.5 mm, and a thickness of said substrate is smaller than or equal to 0.6 mm.

A feature of the 76th embodiment of the invention is that either the linear recording density of said magnetic recording medium of the 69th embodiment is higher than or equal to 100 kFCI, or the recording track density of said magnetic recording medium is higher than or equal to 4 kTPI.

A feature of the 77th embodiment of the invention is that said non-magnetic substrate of the 69th embodiment is an Al alloy on the surface of which has been plated Ni—P; surface-reinforced glass; glass; crystallized glass; Ti; carbon; Si—C; Si; glass-coated crystallized glass; ceramics; or glass-coated ceramics.

A feature of the 78th embodiment of the invention is a magnetic recording medium comprising; a non-magnetic substrate; a plurality of magnetic layers provided on said non-magnetic substrate; and non-magnetic intermediate layers provided among said plurality of magnetic layers; wherein:

a total layer number of said magnetic layers is greater than or equal to 3 and smaller than or equal to 29; and said non-magnetic intermediate layer has a film whose thickness is greater than or equal to 0.1 nm and is smaller than or equal to 5 nm.

A feature of the 79th embodiment of the invention is that said total number of said magnetic layers according to the 78th embodiment is an odd number.

A feature of the 80th embodiment of the invention is a magnetic recording system comprising; a magnetic recording medium; a holding member for holding said magnetic recording medium; a magnetic recording medium driving unit coupled with said holding member; magnetic heads arranged opposite to the respective surfaces of said magnetic recording medium; a magnetic head driving unit for driving said magnetic head; and a read/write signal processing system for controlling said magnetic head driving unit; wherein:

said magnetic recording medium is the magnetic recording medium according to the 78th or 79th embodiment.

A feature of the 81st embodiment of the invention is that said magnetic head of the 80th embodiment is such a magnetic head in which a thin film is employed as at least a portion of a writing magnetic pole, or a reading magnetic pole; and said read/write signal processing system includes a signal processing circuit by mostly likelihood decoding.

A feature of the 82nd embodiment of the invention is that said magnetic head of the 81st embodiment is a magnetic head having an element for reading back a signal by utilizing a magnetoresistive effect; and said read/write signal processing system includes a circuit for correcting asymmetry existing in a waveform of a read signal.

As is known in the art, the characteristic of such a conventional thin-film magnetic recording medium having a single magnetic layer is varied by very small grooves (texture) formed on the surface of the substrate. It is also conceived that the characteristic of the multi-layered magnetic recording medium is varied by the texture. However, a detailed investigation has not yet been performed. The applicants have investigated the relationship between the static magnetic characteristic and the read/write characteristic as follows: With employment of either a fluid, or a tape-shaped machining member containing diamond, alumina, or ceria abrasive grains whose average diameter is from 0.1 to 10 micrometers, the non-magnetic substrate whose surface average roughness factor is smaller than or equal to 1 nm, and which is made of an Ni—P plated Al alloy, surface reinforced glass, crystallized glass, surface glass coated ceramics, Ti, Si, Si—C, carbon, or zirconia, is polished by varying the polishing pressure, the polishing time, or the polishing method, whereby the very small grooves (textures) are formed along the traveling direction of the magnetic head. A plurality of magnetic layers and non-magnetic intermediate layers are alternately stacked directly, or via an underlayer on the polished non-magnetic substrate, and further the protective lubricant film and the like are formed on the stacked layers. As a result, it has been learned that there is a strong correlation between the read/write characteristics and the coercivity orientation degree defined by the below-mentioned equation (2), this read/write characteristic being evaluated by combining the above-described multi-layered magnetic recording medium, magnetoresistive read back head, and inductive recording head:

$$\text{coercivity orientation degree} = \{Hc(\theta) - Hc(r)\}/\{Hc(\theta) + Hc(r)\} \quad (2)$$

In FIG. 1, there is shown a relationship among a read output voltage E, medium noise Nd, signal-to-noise (S/N) ratio, and coercivity orientation degree under a linear recording density of 100 kFCI. In this graphic representation, there are shown relative changes in the read output voltage E, medium noise Nd, and S/N ratio to the values of those parameters when the coercivity orientation degree is equal to 0. Here, the magnetic recording medium is fabricated in such a manner that after the texture has been formed on the surfaces of a Al—Mg alloy disk substrate having Ni—P alloy plated layers on both surfaces thereof, a Cr underlayer having the thickness of 50 nm, a first magnetic layer, a Cr intermediate layer having a thickness of 2 nm, a second magnetic layer, and a carbon protective layer having a thickness of 20 nm are sequentially formed on this disk substrate by way of a sputtering method, and a perfluoro-alkylpolyether lubricant layer having an adsorptive characteristic is further formed on the resultant stacked layers. Both of the first magnetic layer and the second magnetic layer are Co—Cr—Ta alloy layers. The coercivity orientation degree was varied by changing the polishing pressure, the polishing hours, and the polishing method during the formations of the textures. At this time, when a product Br×t between a total thickness "t" of the respective magnetic layers and residual magnetic flux density Br measured by applying a magnetic field along the disk circumferential direction (simply, abbreviated as "a product between residual magnetic flux density and total thickness o magnetic layers), was changed, the resultant read/write characteristic was varied.

Then, to investigate only influences of the coercivity orientation degree, the Cr concentration contained in the Co—Cr—Ta alloy was changed within a range between 8 and 20 at %, and the Ta concentration contained therein was changed within a range between 2 and 6 at %, so that the coercivity measured by applying the magnetic field along the disk circumferential direction became substantially constant within a range between 1900+50 and 1900−50 Oersteds. Furthermore, the thicknesses of the first and second magnetic layers were made identical to each other, and were varied, so that the product (br×t) between residual magnetic flux density and total thickness of magnetic layers was substantially constant within a range of 150±20 gauss micrometers.

To evaluate the read/write characteristic, a composite magnetic head for combining a writing-purpose inductive type thin-film magnetic head with a reading-purpose magnetoresistive type magnetic head was employed. As easily seen from this graphic representation, the read output voltage is increased and the medium noise is decreased in response to an increase of the coercivity orientation degree in a region where the coercivity orientation is smaller than or equal to 0.3. As a result, the signal-to-noise ratio can be increased by 50% at maximum, as compared with a case where the coercivity orientation degree is 0 (namely, in case of no orientation). When the coercivity orientation degree becomes greater than or equal to 4.0, the change in the S/N ratio will be decreased in response to an increase of the coercivity orientation degree.

As previously explained, when the magnetoresistive read-back head and the multi-layered magnetic recording medium are combined with each other, there is a strong correlation between the coercivity orientation degree of the multi-layered magnetic recording medium and the read/write characteristic, therefore, even when the coercivity and the product value of Br×t are substantially the same, it is obvious that a better read/write characteristic can be achieved by controlling the coercivity orientation degree within a proper range. Such an effect specifically becomes important for such a combination between the magnetoresistive read back head and the multi-layered magnetic recording medium. In other words, when the conventional inductive type read/write head is combined with the single-layered magnetic recording medium, the read efficiency of this read/write head is low and the medium noise large, so that the read output becomes relatively low.

As seen from FIG. 1, the reason why the S/N ratio is increased by optimizing the coercivity orientation degree is mainly that the output voltage is increased due to optimization of the coercivity orientation degree. As a consequence, as to the combination between the inductive type read/write head having the relatively low output voltage and the single-layered magnetic recording medium, the above-described effect is small. Actually, when the relationship between the coercivity orientation degree and the read/write characteristic was investigated with employment of such a combination between the inductive type read/write head and the single-layered magnetic medium, no conspicuous change appeared in the read output voltage, the medium noise, and the S/N ratio. It is expected that the coercivity orientation degree of the multi-layered magnetic recording medium is higher than or equal to 0.05, and lower than or equal to 0.6. There is substantially no increasing effect in the S/N ratio in the region where the coercivity orientation degree is lower than 0.05. Conversely, when the coercivity orientation is higher than 0.6, the S/N ratio is lowered. A favorable range of the coercivity orientation degree is greater than or equal 0.15, and smaller than or equal 0.5. At this time, a S/N ratio that is more than 20% higher than that with no orientation was achieved.

Conventionally, it is known in the art that the coercivity orientation degree is changed depending upon the shapes of the very small grooves which have been formed by texturing, and it is required to set the average roughness factor "Ra" of the groove to be greater than or equal to 3 nm in order that the coercivity orientation degree may be set to be greater than or equal to 0.1 in the conventional texturing technique. To increase the recording density of the thin-film medium, it is very important that the space (the head flying height) between the magnetic head and the recording medium must by made as small as possible. This is because a steep magnetic field distribution is formed within the recording medium during the writing operation, and the magnetic flux produced from the recording medium can be detected at high efficiencies during the reading operation, thereby suppressing loss in the read output. However, when the head flying height is made small in the conventional textured medium in which the average roughness factor Ra is greater than or equal to 3 nm, it is likely that the magnetic head will contact the magnetic recording medium many times, as compared with a smooth substrate having no texture. As a result of detailed investigation, it has been learned that this is caused by very small projections with irregularities that are unavoidably formed on the surface of the recording medium by the texturing. Then, when the flying height is small, these projections contact the magnetic head.

A method for reducing the frequency of contact between the magnetic head and the recording medium is to remove the projections formed on the surface of the substrate by way of a polishing process as proposed in JP-A-1-162229. However, the coercivity orientation degree is lowered in comparison with that for the case where the projections have not been polished, and at the same time, modulation occurs. When the groove of the texture is deep, both uniformity and S/N ratio of the servo signals previously recorded on the recording medium, which are required when the tracks on which the information is recorded pass by the head, are deteriorated, as compared with those of a smooth substrate with no texture. As a consequence, the track density cannot be increased.

To solve the above-described problems such as the head floating characteristic and the servo signal deterioration, it may be useful to make the grooves shallow. However, as described in *IEEE TRANSACTIONS MAGNETICS*, Volume 23, page 3405, issued in 1987, when the grooves are made shallow, there is a further problem that the magnetic characteristics of the magnetic layer, measured by applying the magnetic field along the head traveling direction, is deteriorated.

As previously explained, if the average roughness factor "Ra" is large, then either the head floating characteristic or the quality of the servo signal is lowered. Under such circumstances, the applicants have tried to search for texture processing method capable of obtaining a sufficient coercivity orientation degree even if the average roughness factor "Ra" of the surface is small, by varying the polishing pressure, the polishing time, the polishing method, and so on with employment of the non-magnetic substrate whose surface average roughness factor is smaller than or equal to approximately 1 nm. As a result, although conventionally the average roughness factor "Ra" of the surface should be selected to be greater than 3 nm in order to achieve a coercivity orientation degree greater than or equal to 0.1 even when the head floating characteristic is sacrificed, the applicants learned of such a magnetic recording medium have the superior head floating characteristic and the magnetic anisotropy superior in the head traveling direction even when the roughness of the grooves appeared on the surfaces of the magnetic layer, which is completely different from the common sense in this field.

This may be caused by the below-mentioned effects. That is, the coercivity orientation degree along the head traveling direction of the coercivity can be higher than or equal to 0.1 within a range of $0.3 \text{ nm} \leq Ra \leq 3$ nm by controlling, based on the abrasive grain processing time and the abrasive grain processing pressure, a ratio "$Ra(r)/Ra(\theta)$" of the average roughness factor $Ra(\theta)$ measured along the direction substantially equal to the magnetic head traveling direction to the average roughness factor $Ra(r)$ measured along the direction substantially perpendicular to this head traveling direction, and furthermore by selecting the average grain diameter of the processed grains to be smaller than or equal to 1 micrometer, preferably smaller than or equal to 0.5 micrometers.

Thus, the reason why a higher coercivity orientation ratio compared with that of the conventional recording medium can be obtained even for such a medium with a small surface roughness factor, is that the very small grooves can be formed at high density by utilizing the feature that cutting capabilities of the polishing abrasive grain are the highest at the beginning of the cutting process. In other words, as represented in FIG. 2, although the average roughness factor $Ra(r)$ along the direction substantially normal to the head traveling direction is remarkably increases in accordance with an increase in the processing time, a change in the surface average roughness factor $Ra(\theta)$ along the head traveling direction is slower than that of the other roughness factor $Ra(r)$. It may be conceived that the abrasive grains could give effects to the polishing process at the highest efficiency during the initial processing time domain where the roughness factor $Ra(r)$ is sharply changed. It is also conceivable that when the range of the ratio $Ra(r)/(\theta)$ is set between 1.1 and 5.0, the grooves whose dimension is on the order of the crystal grain which may give influences to the growth of the crystal grain are formed at the higher density, and the coercivity orientation degree could be increased. As in the prior art recording media, when an excessively long process time is required and the large abrasive grain diameters are employed, such extraordinary projections and burrs are made on the media surfaces, whereby the head floating characteristic is deteriorated and the coercivity orientation degree is lowered.

Furthermore, the applicants have considered the relationship among the crystal structures, the magnetic characteristics, and the read/write characteristics by varying the compositions of the underlayer, the magnetic layers, and the non-magnetic intermediate layers. As a result, when an underlayer having a thickness of 5 nm to 500 nm and made of Cr, Mo, Hc, Nb, Tb, or an alloy containing these materials as a major component is formed on the above-described texture-processed substrate; magnetic layers made of Co, Fe, Ni, or an alloy containing these materials as a major component, preferably containing alloys such as Co—Ni, Co—Cr, Co—Fe, Co—Mo, Co—W, Co—Pt, Co—Re as a major component; and also non-magnetic intermediate layers containing Cr, Mo, W, V, Ta, Nb, Zr, Ti, B, Be, C, Ni—P are successively formed on the resultant underlayer, the coercivity orientation degree is improved and a better read/write characteristic is obtained. This is because the crystal lattice plane (100), or (110) of the crystal of the underlayer has been grown in parallel to the substrate, and the crystal lattice plane (110) of the magnetic layer located over this underlayer has been grown substantially in parallel with the substrate. In particular, when the magnetic layer is made of an alloy layer containing Co as a major component, preferably an alloy layer containing Co higher than 72 at %, and also both the underlayer and the non-magnetic intermediate layer are constituted by the layer containing Cr, Mo, W as the major component, such crystal orientation is emphasized that the crystal lattice plane (100) or (110) of the underlayer is located in parallel to the substrate, and also the crystal lattice plane (110) of the magnetic layer is located substantially in parallel to the substrate. At the same time, the coercivity orientation degree within the range defined by the formula (1) can be easily obtained. When the Ar concentration contained in the above-described underlayer, magnetic layers, and non-magnetic intermediate layers is higher than or equal to 2.0 at %, since the above-defined crystal orientation cannot be readily obtained, is not preferable.

When superior corrosion resistance is required, such an alloy containing Cr, Mo, or W as a major component and to which any of Nb, Ti, Ta, Pt, Pd, Si, Fe, V or P has been added is utilized as the underlayer, or the non-magnetic intermediate layer. Further, an alloy containing Co—Ni—Zr, Co—Cr—Pt, Co—Cr—Ta, or Co—Ni—Cr as a major component is employed as the magnetic material for constituting the magnetic layers.

To increase the storage capacity of the magnetic disk apparatus, the storage capacity per single disk must be increased by increasing the recording density, and at the same time, as many magnetic disks as possible must be installed into the magnetic disk apparatus by increasing the packaging density. If the diameter of the disk is made constant, since the thickness of the disk substrate and the height of the magnetic head slider are made small, a large number of magnetic disks may be packaged. When a magnetic head slider having a height of 0.5 nm is employed, and the thickness of the disk substrate is selected to be from 0.8 mm (recently, a popular thickness) to less than 0.6 mm, the magnetic disks, the total number of which is greater than that of the conventional disk apparatus by more than 1, can be packaged into the magnetic disk apparatus having a height of ½ inch. The applicants have considered that a disk substrate having a thickness below 0.6 mm is utilized. As a result, there is such a trend that the modulation where the read output is varied within a single disk plane becomes large, as compared with the conventional disk substrate which has a thickness of 0.8 mm. This is because the thermal capacity of the substrate becomes small since the thickness of the substrate is made smaller, and a large temperature difference is produced due to a small thermal constant distribution.

Such a modulation can be considerably reduced by performing the above-explained texture processing. In other words, since very small grooves that are capable of satisfying $0.3 \text{ nm} \leq Ra(r) \leq 3 \text{ nm}$ and $1.1 \leq Ra(r)/Ra(\theta) \leq 3.0$ are formed by way of the above-described texture processing, the problems about the floating characteristic of the magnetic head and also the quality of the servo signal can be solved, and at the same time, the problem concerning the modulation (which may be especially emphasized when the thickness of the substrate is made thin) can be solved.

Also, when as the substrate, there are provided a surface reinforced crystallized glass which has superior smoothing and which is capable of stably floating the magnetic head at lower heights (such as glass, a ceramic such as Si—C, a non-magnetic substrate such as Si and carbon, or a substrate whose surface is non-magnetic, such as surface Ti oxide), the following problems may occur. That is, the crystal orientation of the medium magnetic layer is disturbed, the characteristic becomes nonuniform, and a higher read output cannot be produced. Although this may be probably caused by productions of adsorptive gas from the substrate, or by lower levels of the surface energy of the substrate, the true reason is not clear.

The applicants have tried to study various solutions. As a result, a better characteristic is obtained when the underlayers are constructed of at least two non-magnetic layers, and the underlayer positioned next to said non-magnetic substrate is made of either Zr, Si, Ti, Y, Sc, Al, D, Ge, Sb, Ga, Ru, Pd, V, Nb, Hf, Rh, Ni—P, or an alloy layer containing these materials as a major component. Thereafter, underlayers made of Cr, Mo, W, Nb, Ta, or an alloy containing these materials as a major component, and the magnetic layers and the non-magnetic intermediate layers are fabricated. The production of gas from the substrate can be suppressed by way of the underlayers formed next to the substrate, and furthermore the surface energy is increased.

When the coercivity $Hc(\theta)$ measured by applying a magnetic field along the head traveling direction is set to be greater than or equal to 1400 Oersteds, and the product ($Br \times t$) between the residual magnetic flux density and the total thickness of the magnetic layers is within a range between 30 and 2800 gauss micrometers, the ratio (resolution) of the read output obtained by the read/write operations at high linear recording density, to the read output obtained by the read/write operations at low linear recording density, can be preferably improved. When the thickness of the non-magnetic intermediate layer is selected to be greater than or equal to 0.1 nm, the magnetic interaction among the magnetic layers may be preferably reduced. However, when the thickness of this non-magnetic intermediate layer exceeds 20 nm, since the interval between the magnetic head and the lowermost magnetic layer becomes large, the overwrite characteristic deteriorates. Also, when the coercivity orientation degree exceeds 0.15, it can be seen that the overwrite characteristic is deteriorated. To solve this deterioration of the overwrite characteristic, it is useful to employ a soft magnetic thin film such as an Fe—Co—Ni alloy or an Fe—Si alloy, which has a saturation magnetic flux density greater than that of the conventional Ni—Fe alloy, as the magnetic pole of the recording head. In particular, when the soft magnetic thin film has a saturation magnetic flux density that exceeds 15,000 Gausses, better characteristics can be obtained.

Furthermore, the applicants have considered the overwrite characteristic and the noise reduction effect as to the multilayered magnetic recording medium. As a consequence, it has been found that even better characteristics can be achieved by selecting the thickness of the non-magnetic intermediate layer to be less than or equal to 5 nm, and also by selecting the layer number of the magnetic layers to be odd.

In a multi-layered magnetic layer recording medium, since the thickness of each magnetic layer is made thin and the non-magnetic intermediate layers are interposed between the magnetic layers, magnetic layers having very small crystal grains can be stacked. Moreover, since the exchange interaction among the magnetic layers can be lowered until it may be recognized that the respective magnetic layers are essentially independent, low noise can be realized. Also, the read output can be increased by stacking a large number of the magnetic layers. Based upon this reasoning, a higher S/N ratio can be realized in the multi-layered magnetic recording medium in which the non-magnetic intermediate layers are provided among the magnetic layers.

However, the effects to weaken the interaction exerted among the magnetic layers differ from each other, depending on the number of the magnetic layers. Since a structure in which the leakage fields exerted from the respective layers are difficult to be closed, can be made while the independence among the respective layers can be increased by selecting the number of the stacked magnetic layers of the multi-layered magnetic recording medium to be odd, the efficiency of the noise reduction effects can be increased, so that a high S/N ratio can be achieved. Also, since the effective film thickness of the magnetic layers involving the non-magnetic intermediate layers becomes thick, there is a trend that the overwrite characteristic would be deteriorated. To maintain the better overwrite characteristic while keeping the high S/N ratio, it is important to make the effective film thickness of the magnetic layers thin. Preferably, it is feasible for the better overwrite characteristic to select the film thickness of the non-magnetic intermediate layers to be less than or equal to 5 nm.

With respect to the formation of the non-magnetic intermediate layer, it is not required to actually form this non-magnetic intermediate film by utilizing the physical film forming method. That is, it is sufficient that the film formation of the magnetic layer be repeated in such a manner that the film formation of the magnetic layers stopped and then again commenced, whereby the oxide layer, the nitrogen containing layer, the carbon containing layer, or the mixture layer of these layers, which has a thickness of 0.1 nm or more, may be formed between the magnetic layers. This gives the same effect as when the non-magnetic intermediate layers are specially formed among the magnetic layers.

In addition, the applicants have investigated the read/write characteristics by changing the composition of the magnetic layer located very close to the surface of the medium (uppermost magnetic layer) in the multi-layered magnetic recording medium, with use of Co as the major component in the various trials. As a result of this investigation, it was learned that, when the Co concentration of the uppermost magnetic layer is made lower than that of other magnetic layers, the medium noise is lowered. Apparently, lowering the Co concentration causes the residual magnetic flux density of the uppermost magnetic layer to be lowered.

At this time, although it is seen that the read out is lowered, the ratio of reduction of the medium noise to reduction of the read output becomes large when the coercivity orientation degree is within the range defined by the formula (1), so that a high S/N ratio is achieved. More specifically, when this recording medium is combined with a magnetoresistive element capable of detecting leakage fields induced from the recording medium with a very high efficiency by utilizing the large magnetoresistive effect (giant magnetoresistive effect, or spin valve effect) produced in such a type of magnetic thin film for stacking a plurality of magnetic layers via the non-magnetic layers, a magnetic recording system with a higher S/N ratio can be realized. This is because the adverse influence of the noise produced in the amplifier system is relatively small. When a magnetoresistive element with using either the giant magnetoresistive effect or the spin valve effect is employed, the product (Br×t) between the residual magnetic flux density and the total thickness of the magnetic layers is reduced to 30 to 130 Gauss micrometers. As a result, both a sufficiently large read output and high resolution can be realized.

Conversely, when the Co concentration of the uppermost magnetic layer is made higher than that of other magnetic layers, the read output was increased. It is conceivable that the residual magnetic flux density of the uppermost magnetic layer would be increased due to an increase of the Co concentration. When this magnetic recording medium is combined with the conventional magnetoresistive head having a relatively lower sensitivity than that of a head with using the above-described giant magnetoresistive effect, a high S/N ratio can be realized for the overall recording system. This is because the adverse influences of noise produced in the amplifier system are relatively large.

Furthermore, a high-density recording medium with high reliability may be obtained by forming protective layers such as carbon, having thickness of 10 nm to 50 nm, as the protective layer for the magnetic layer, and furthermore by forming the lubricant layer of absorptive perfluoroalkylpolyether having thickness of 3 nm to 20 nm. When a carbide such as tungsten carbide or (W—Mo)—C, a nitride such as (Zr—Nb)—N or silicon nitride, an oxide such as silicon oxide or zirconia, or boron, boron carbide, MoNb, or Rh are utilized as the protective layer, both sliding resistance and corrosion resistance may be improved. After these protective layers have been formed, the resultant medium is plasma-etched with employment of the very fine mask so as to form a very slightly convex/concave configuration on the surface. Otherwise, a projection made of a different phase is produced by utilizing a target made of a compound and a mixture, or a concave/convex configuration is fabricated by performing a thermal treatment. As a result, the contact area between the magnetic head and the recording medium can be reduced, so that the head will not adhere to the surface of the medium during the CSS operation.

When the above-described magnetic recording medium is manufactured in accordance with the below-mentioned manner, the quantity of bit errors that occur when the flying height of the head is smaller than or equal to 0.1 micron can be preferably reduced. That is, after the non-magnetic substrate whose average roughness factor Ra is smaller than or equal to 2 nm has been polishing (by using the polishing material containing polishing abrasive grains, the average diameter of which is smaller than or equal to 1 micron, and preferably 0.5 micrometers) along a direction substantially equal to the traveling direction of the magnetic head to form the grooves, both the magnetic layer and the protective layer are fabricated directly, or via at least one underlayer on the non-magnetic substrate, by way of the physical vaporizing means. Then, a range of the average roughness factor Ra(r) is selected to be larger than or equal to 0.1 nm, and smaller than or equal to 5 nm, and preferably larger than or equal to 0.3 nm, and smaller than or equal to 3 nm.

As another method to form the above-described magnetic recording medium, it is possible to form the texture on the underlayer instead of on the substrate. That is, after the underlayer whose average roughness factor Ra is selected to be smaller than or equal to 2 nm, and which has been formed on the non-magnetic substrate, is polished along the direction substantially equal to the traveling direction of the magnetic head by using the polishing materials containing polishing abrasive grains whose average diameter is smaller than or equal to 1 micron, and preferably smaller than or equal to 0.5 micrometers, whereby after forming the grooves, both the magnetic layers and the non-magnetic intermediate layers are fabricated directly or via the underlayers on the resultant underlayer with the grooves by way of the physical vaporizing means. As a consequence, the average roughness factor Ra(r) may be selected to be larger than or equal to 0.1 micron and smaller than or equal to 5 nm, and also, the range of the ratio Ra(r)/Ra(θ) may be selected to be larger than or equal to 1.1 and smaller than or equal to 5.0.

Since the S/N ratio of the magnetic recording system according to the present invention is high and the concave/convex configuration formed on the surface of the magnetic recording medium is small, a stable head floating characteristic can be obtained. Further, since a head positioning servo signal of high grade can be produced, the Mean Time Between Failure (MTBF) can become more than 0.15 million hours under a high recording density of 600 Megabits per 1 inch$^2$. When the recording density is selected to be 300 Megabits per 1 inch$^2$, MTBF may become more than 0.30 million hours. When carbon, Si—C, or Si with low density is employed as the substrate, since the rising time of the substrate rotation is increased, the above-described effects are particularly emphasized. When glass, reinforced glass, or glass-coated crystallized glass is employed which may effectively smooth the surface of the substrate, the contact probability of the magnetic head may be considerably lowered.

DESCRIPTION OF THE PREFERRED EMBODIMENTS

Referring now to drawings, a magnetic recording system according to preferred embodiments of the present invention will be described.

(EMBODIMENT 1)

Figure 1:
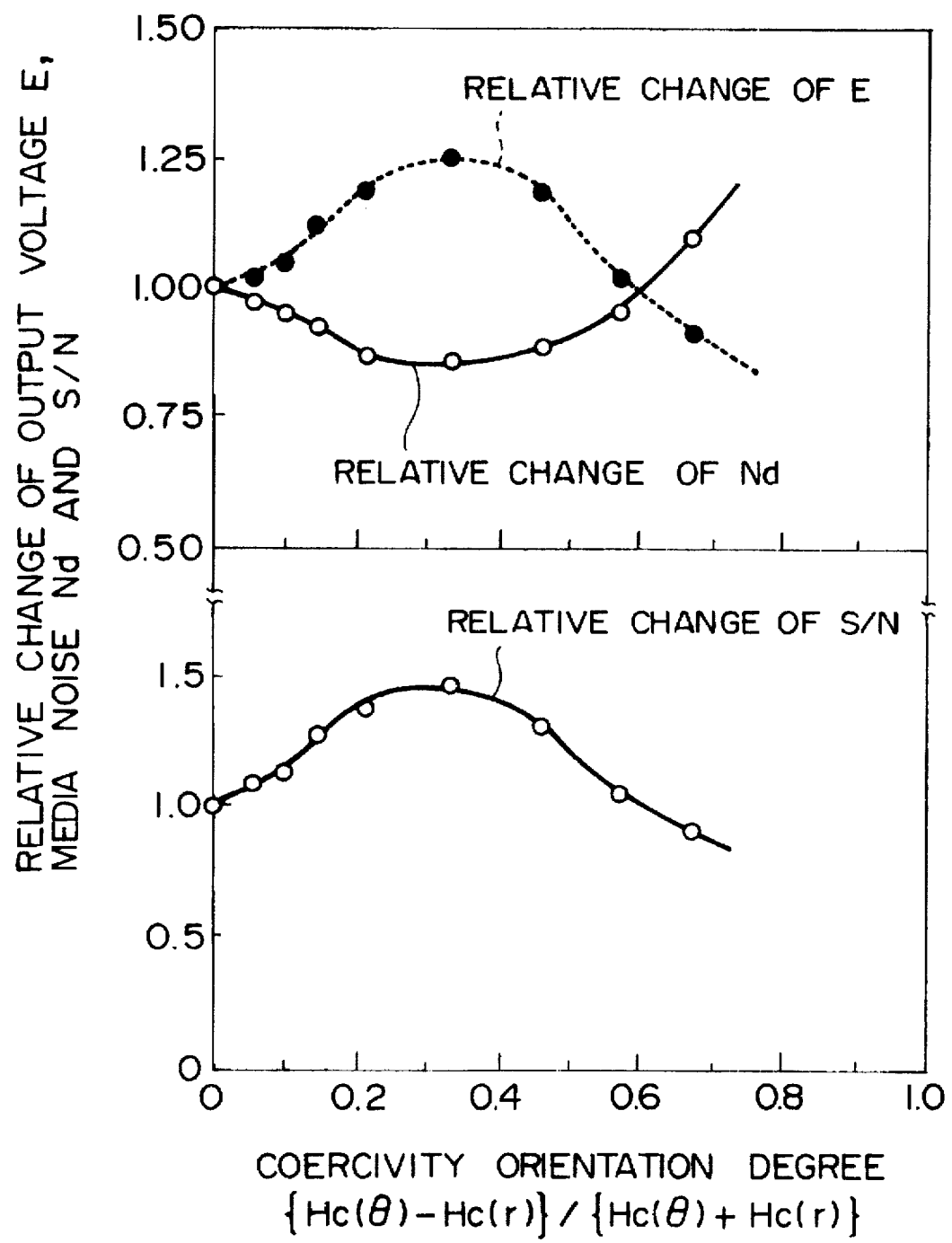
FIG. 1 graphically represents a relationship among read output voltage E, media noise Nd, signal-to-noise (S/N) ratio, and coercivity orientation degree of a multi-layered magnetic recording medium in a magnetic recording system according to the present invention.
Figure 2:
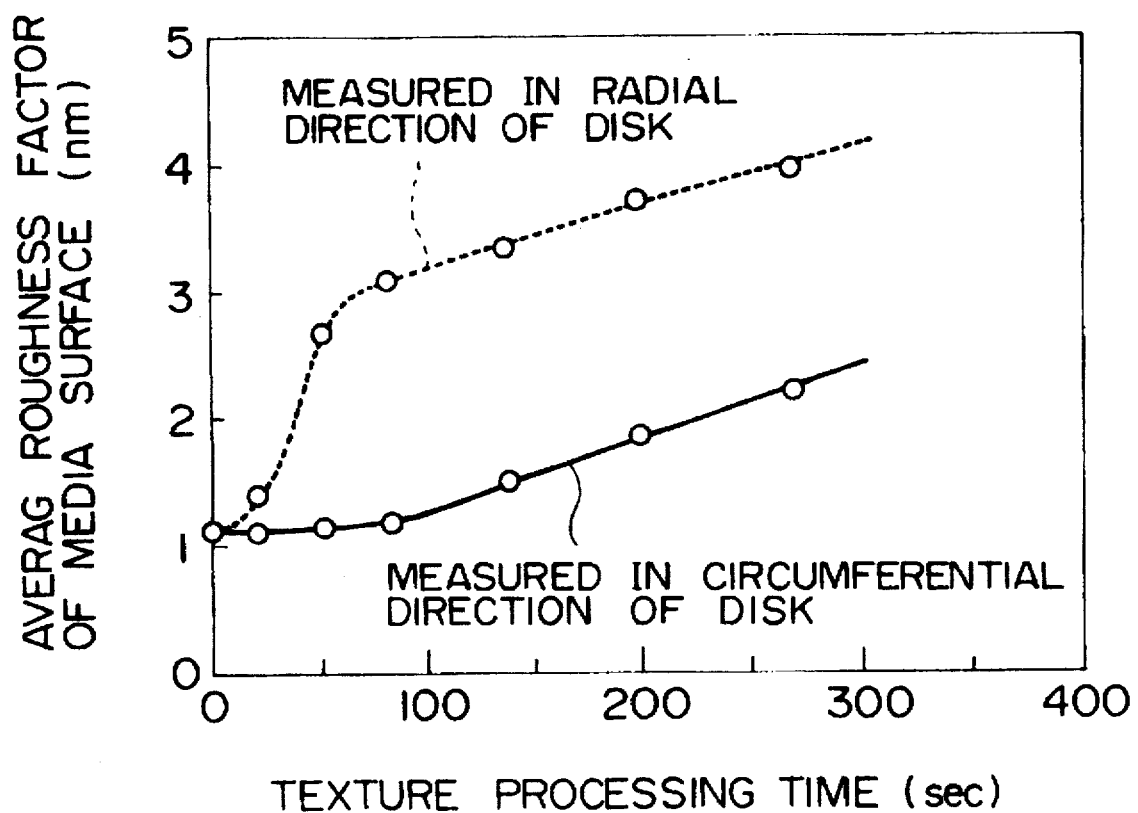
FIG. 2 graphically shows a relationship between average roughness factor and texture processing time measured along a head traveling direction on a surface of a multi-layered magnetic recording medium, and along a direction perpendicular to this head traveling direction in a magnetic recording system according to the present invention.
Figure 3A:
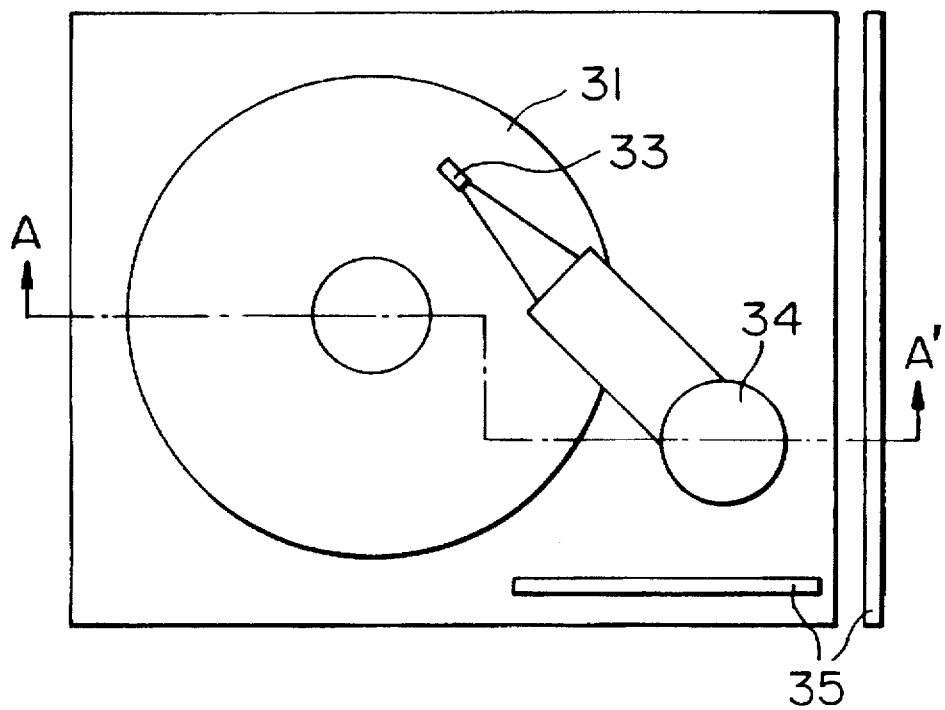
FIG. 3A schematically illustrates a plan view of a magnetic recording system according to an embodiment of the present invention.
Figure 3B:
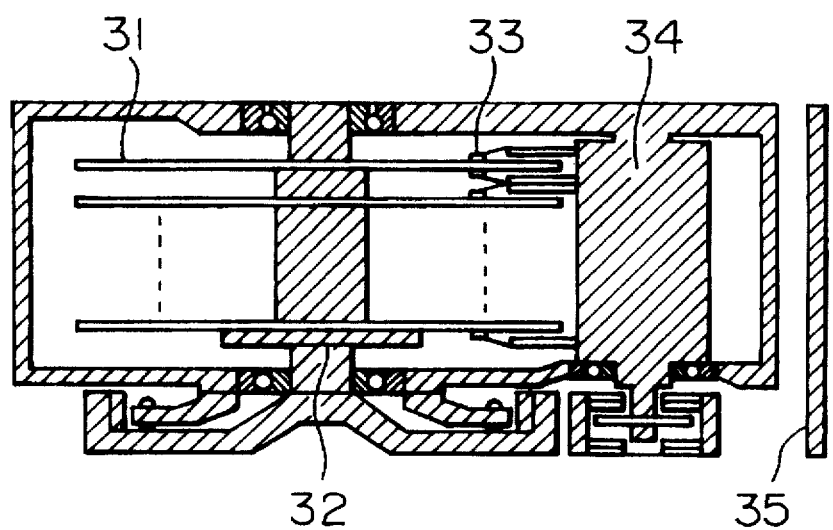
FIG. 3B is a sectional view of this magnetic recording system, taken along a line A–A' of FIG. 3A.

An explanation will now be made of a magnetic recording system according to an embodiment 1 of the present invention with reference to FIGS. 3A, 3B, 4, 5 and 6. In FIGS. 3A and 3B, there are shown a schematic plan view of the magnetic recording system according to this embodiment 1, and a schematic sectional view thereof. This system has a well known basic construction arranged by a magnetic recording medium 31, a drive unit 32 for rotatably driving this magnetic recording medium 31, a magnetic head 33, a drive means 34 for driving the magnetic head 33, and a read/write signal processing means 35 of the magnetic head.

Figure 4:
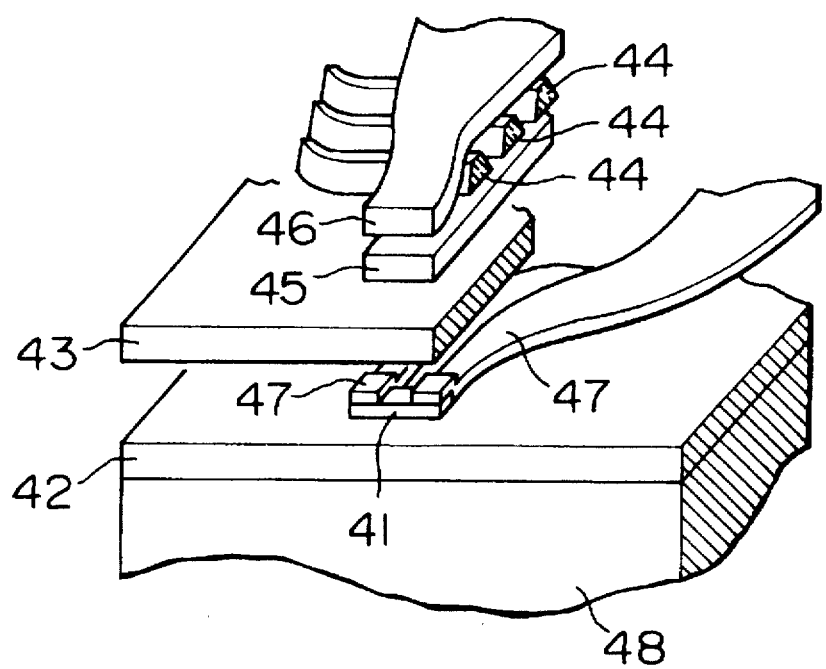
FIG. 4 is a perspective view showing one example of a sectional structure of a magnetic head employed in a magnetic recording system according to the present invention.

A structure of the magnetic head employed in this magnetic recording system is schematically indicated in FIG. 4. This magnetic head corresponds to a read/write separating type head by combining a write-purpose electromagnetic induction type magnetic head with a read-purpose magnetoresistive type head, which have been formed on a base 48. A portion including the magnetoresistive sensor 41 sandwiched by a lower shield layer 42 and an upper shield layer 43 functions as a reproducing head, whereas a lower recording magnetic pole 45 and an upper recording pole 46, which sandwich a coil 44 together, function as a writing head. An output signal from the magnetoresistive sensor 41 is externally derived via an electrode pattern 47.

Figure 5:
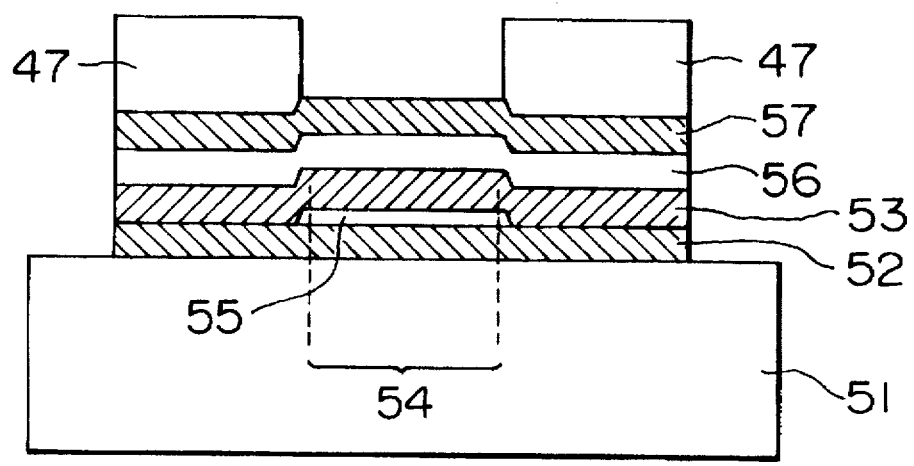
FIG. 5 schematically illustrates one example of a sectional structure of a magnetoresistive sensor portion of a magnetic head employed in a magnetic recording system according to the present invention.

In FIG. 5, there is shown a sectional view of the structure of the magnetoresistive sensor 41. This magnetoresistive sensor 41 includes a magnetoresistive conducting layer 53 made of a ferromagnetic material, formed on a gap layer 51 defined between the shield layer and the magnetoresistive sensor; an antiferromagnetic domain control layer 52 for defining this magnetoresistive conducting layer as a single magnetic domain; a non-magnetic layer 55 for breaking exchange interaction between the magnetoresistive conducting layer and the antiferromagnetic domain control layer in a magnetic sensitive portion 54 of the magnetoresistive conducting layer; a permanent magnet film bias layer 57 (or a soft magnetic layer) functioning as a means capable of producing a biasing magnetic field for the magnetic sensitive portion; and a high resistive layer 45 used to adjust a current shunting ratio of currents flowing between either the soft magnetic layer or the permanent magnet film bias layer and the magnetoresistive conducting layer. A method for manufacturing this magnetic head will be explained hereinafter.

A sintered member having Al oxide-Ti carbide as a major component was used as a base for the slider. A sputtered Ni—Fe alloy film was employed in the shield layer and the recording magnet. The thickness of the upper/lower shield layers were selected to be 1 micrometer, and the thickness of the recording magnet was selected to be 3 micrometers. The gap layer of Al oxide was formed by sputtering among the shield layer, the magnetoresistive sensor, and the recording magnet. The thickness of the gap layer between the shield layer and the magnetoresistive sensor was selected to be 200 nm, the thickness of the gap layer between the recording magnets was selected to be 300 nm, and the thickness of the gap layer between the shield layer and the recording magnet (namely, an interval between the reproducing head and the recording head) was selected to be approximately 4 micrometers. Copper (Cu) having a thickness of 3 micrometers was employed as the coil.

As the magnetoresistive conducting layer of the magnetoresistive sensor, a Ni—Fe alloy layer having a thickness of 30 nm was sputter-fabricated. As the antiferromagnetic domain control layer, a NiO layer having a thickness of 35 nm was sputter-formed. As the non-magnetic layer for breaking the exchange interaction between the magnetoresistive conducting layer and the antiferromagnetic domain control layer, a Nb layer having a thickness of 2 nm was sputter-formed. As the soft magnetic bias layer, a Ni—Fe—Nb alloy soft magnetic layer having a thickness of 40 nm was sputter-fabricated. Furthermore, as the electrode pattern, a Cu thin film having a thickness of 100 nm was sputter-formed.

Figure 6:
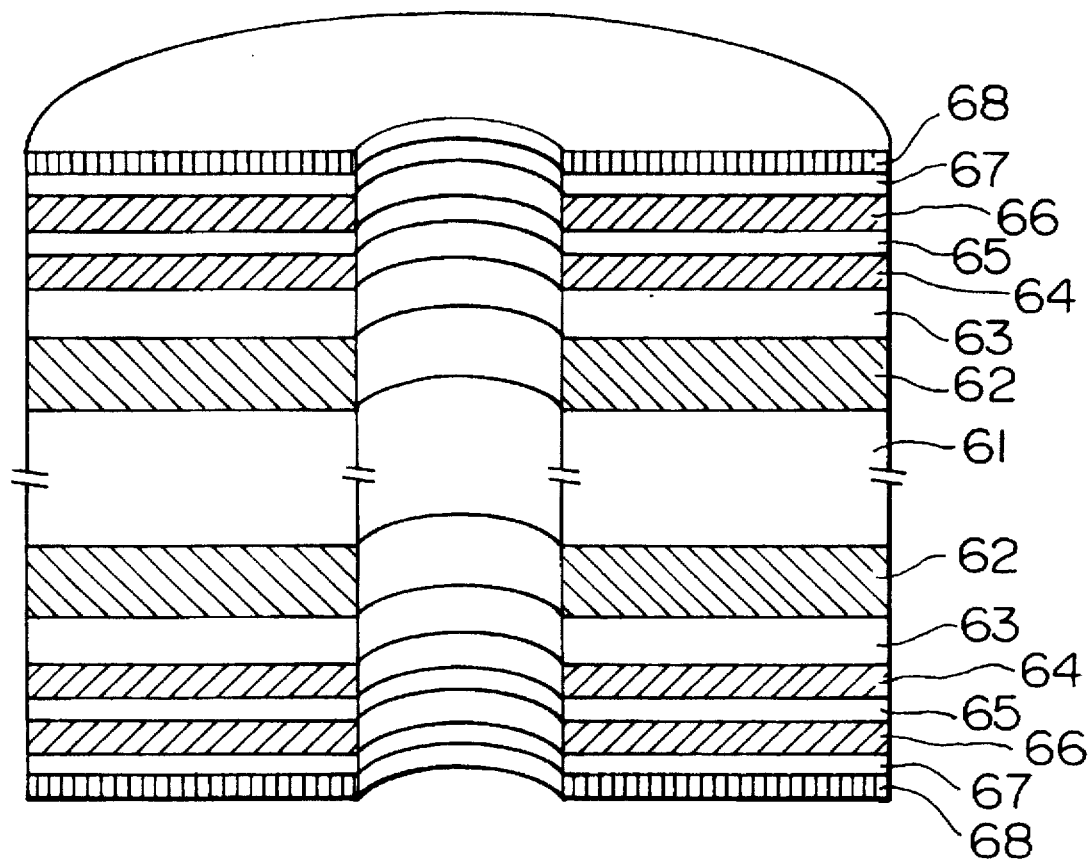
FIG. 6 is a perspective view showing one example of a sectional structure of a multi-layered magnetic recording medium in a magnetic recording system according to the present invention.

A sectional view multi-layered magnetic recording medium is schematically shown in FIG. 6. When the substrate 61 was made of an Al—Mg alloy, chemical reinforced glass, Ti, Si, Si—C, carbon, crystal glass, or ceramics, non-magnetic plated layers 62 made of Ni—P, Ni—W—P, or the like are formed on this substrate, followed by an underlayer 63 made of Cr, Mo, W, or an alloy made of any one of the above-described materials as a major component; and a first magnetic layer 64 and a second magnetic layer 66, which are made of Co—Ni, Co—Cr, Co—Re, Co—Pt, Co—P, Co—Fe, Co—Ni—Zr, Co—Cr—Pt—B, Co—Cr—Al, Co—Cr—Ta, Co—Cr—Pt, Co—Ni—Cr, Co—Cr—Nb, Co—Ni—P, Co—Ni—Pt, Co—Cr—Si and so on. Further, the multi-layered magnetic recording medium contains a non-magnetic intermediate layer 65 formed between the first magnetic layer and the second magnetic layer, made of either Cn, Mo, W, or an alloy containing any one of these materials as a major component; a protection layer 67 made of carbon, boron, silicon carbide, silicon nitride, silicon oxide, tungsten, carbide, (W—Mo)—C, (W—Zr)—C and so on; and further a lubricant layer 58 such as perfluoroalkylpolyether. Now, a description will be made of a method for manufacturing this multi-layered magnetic recording medium.

That is, a plated layer made of Ni-12 wt % P (the numeral indicated in front of atomic number implies an amount of the relevant material) having a thickness of 13 micrometers was formed on both surfaces of a disk substrate made of an Al-4 wt % Mg material whose outer diameter was 95 mm, whose inner diameter was 25 mm, and whose thickness was 0.4 mm. The surfaces of this non-magnetic substrate were polished under smooth conditions by employing a lapping machine until the average roughness factor "Ra" of the surface became 2 nm. These surfaces were washed and further dried. Thereafter, with employment of a tape polishing machine (for instance, as disclosed in JP-A-2-262227), a polishing tape was penetrated through a contact roll and depressed toward both sides of the disk plane while the disk substrate 51 was rotated under abrasive grains, so that textures were formed along a substantially circumferential direction on the surfaces of the disk substrate. Further, contaminants such as a polishing agent attached to the substrate were washed/removed, and then the substrate dried.

The resulting disk substrate was heated up to a temperature of 250° C. in a vacuum within a magnetron sputtering apparatus, and a Cr lower layer having a thickness of 50 nm was formed under Ar pressure of 2 mTorr on this disk substrate. On this underlayer, there were successively stacked a first magnetic layer made of Co-16 at % Cr-4 at % Ta and having a thickness of 12 nm, a Cr non-magnetic intermediate layer having a thickness of 2 nm, and a second magnetic layer having a thickness of 12 nm. It should be noted that the composition of the second magnetic layer was identical to that of the first magnetic layer. Subsequently, a carbon protection layer having a thickness of 30 nm was formed on the second magnetic layer, and finally, a lubricant layer made of perfluoroalkylpolyether and having an adsorptive characteristic was formed.

As shown by an X-ray diffraction analysis of the thus formed magnetic recording medium, crystal was orientation-grown in the Cr underlayer in such a manner that a crystal lattice plane (100) or (110) was located substantially parallel to the substrate, and the magnetic layer was orientation-grown in such a manner that the crystal lattice plane (110) was located substantially parallel to the substrate. The coercivity Hc(θ) was 1970 Oersteds, which was measured by applying the magnetic field along the disk circumferential direction of the magnetic recording medium; the coercivity orientation degree was 0.31; and a product Br×t between residual magnetic flux density and total thickness of the magnetic layers was 132 gauss microns. Also, the average roughness factor Ra(θ) of the medium surface measured along the travel direction of the magnetic head was 1.5 nm, and the ratio of Ra(r) to Ra(θ) was 1.7. To measure this average roughness factor, a needle touch type surface roughness measuring device with the needle having a tip diameter of 0.2 micrometers was employed. When an amount of impurity contained in the underlayer, the first/second magnetic layers and the non-magnetic intermediate layer was analyzed by utilizing an electron beam probe microanalyzer, the amount of Ar contained therein being less than 0.5 at %.

When the read/write characteristic was evaluated by employing the magnetic recording system according to this embodiment under such conditions that the height of the magnetic head slider was selected to be 0.48 mm, the head flying height was 70 nm, the linear recording density was 115 kBPI, and the track density was 5.2 kTPI, the signal-to-noise ratio of this magnetic recording system was 1.6. When the input/output signals of the magnetic head were processed, information of 600 Megabits could be read and written on the recording medium having 1 cm$^2$ area under the head flying height of 70 nm. Moreover, the bit error number after the head seek test from the inner circumferential portion to the outer circumferential portion had been executed 50,000 times, was less than 10 bits/plane, and 0.15 million hours of MTBF (Mean Time Before Failure) could be achieved. When the recording density was selected to be 300 Megabits per 1 cm$^2$, the information could be read/written with the head flying height of 110 nm, and 0.30 million hours of MTBF could be achieved.

(EMBODIMENT 2)

In a magnetic recording system having a similar structure to that of the above-explained first magnetic recording system, a glass substrate having a diameter of 2.5 inches and a thickness of 0.4 mm is employed as a substrate. Texture has been formed on the surface of this glass substrate along a direction substantially equal to the circumferential direction in a manner similar to that of Embodiment 1. As an underlayer for the glass substrate, a Zr layer having a thickness of 150 nm was formed on this surface under argon pressure of 2 mTorr. Furthermore, a Cr underlayer, a first magnetic layer, a Cr non-magnetic intermediate layer, and a lubricant layer, which are similar to those of Embodiment 1, are successively formed on this Zr underlayer for the glass substrate.

As shown by an X-ray diffraction analysis of the thus fabricated magnetic recording media, crystal was orientation-grown in such a manner that a crystal lattice plane (100) or (110) was located substantially parallel to the substrate, and the magnetic layer was orientation-grown in such a manner that the crystal lattice plane (110) was located substantially parallel to the substrate in this Cr underlayer. The coercivity Hc(θ) was 1950 Oersteds, the coercivity orientation degree was 0.29, and the product Br×t between residual magnetic flux density and total thickness of the magnetic layers was 129 gauss microns. Also, the average roughness factor Ra(θ) of the medium surface measured along the travel direction of the magnetic head was 1.4 nm, and the ratio of Ra(r) to Ra(θ) was 1.7. The amount of Ar contained in the underlayer, the first and second magnetic layers, and the non-magnetic intermediate layer was less than 0.5 at %.

When the read/write characteristic was evaluated by employing the magnetic recording system according to this embodiment under such conditions that the height of the magnetic head slider was set to 0.48 mm, the head flying height was set to 70 nm, the linear recording density was selected to be 115 kBPI, and the track density was selected to be 5.2 kTPI, the signal-to-noise (S/N) ratio of this magnetic recording system was 1.6. When the input/output signals of the magnetic head were processed, information of 600 Megabits could be read/written on/from the recording medium having 1 cm$^2$ under a head flying height of 70 nm. Moreover, the bit error number after the head seek test had been executed 50,000 times from the inner circumferential portion out to the outer circumferential portion was lower than or equal to 10 bits/plane. Further, 0.15 million hours of MTBF could be achieved. When the recording density was selected to be 300 Megabits per 1 cm$^2$, the information could be read/written with a head flying height of 110 nm, and then 0.30 million hours of MTBF could be achieved.

(EMBODIMENT 3)

In a magnetic recording system having a similar structure to that of the above-explained first magnetic recording system, an Si—C substrate having a diameter of 2.5 inches and a thickness of 0.4 mm was employed. Texture was formed on the surface of this glass substrate along a direction substantially equal to the circumferential direction in a manner similar to that of Embodiment 1. As an underlayer for the Si—C substrate, a Zr layers having a thickness of 50 nm was formed on this substrate under argon pressure of 2 mTorr. Furthermore, there were successively stacked a Co-16 at % Cr-4 at % Ta layer having a thickness of 13 nm, functioning as the first magnetic layer; a Cr non-magnetic intermediate layer having a thickness of 2 nm; and a Co-11 at % Cr-4 at % Ta layer having a thickness of 11 nm functioning as the second magnetic layer. In addition, a carbon layer and a lubricant layer were successively formed on this stacked structure in a similar manner to that of Embodiment 1.

As shown by an X-ray diffraction analysis of the thus fabricated magnetic recording media, crystal was orientation-grown in such a manner that a crystal lattice plane (100) or (110) was located substantially parallel to the substrate, and the magnetic layer was orientation-grown in such a manner that the crystal lattice plane (110) was located substantially parallel to the substrate in this Cr underlayer. the coercivity Hc(θ) measured while the magnetic field is applied along the disk circumferential direction of this magnetic recording medium was 1930 Oersteds, the coercivity orientation degree was 0.32, and the product Br×t between residual magnetic flux density and total thickness of the magnetic layers was 136 gauss microns. Also, the average roughness factor Ra(θ) of the medium surface measured along the travel direction of the magnetic head was 1.4 nm, and the ratio of Ra(r) to Ra(θ) was 1.8. The amount of Ar contained in the underlayer, the first and second magnetic layers, and the non-magnetic intermediate layer was less than 0.5 at %.

When the read/write characteristic was evaluated by employing the magnetic recording system according to this embodiment under such conditions that the height of the magnetic head slider was set to 0.41 mm, the head flying height was set to 70 nm, the linear recording density was selected to be 115 kBPI, and the track density was selected to be 5.2 kTPI, the signal-to-noise (S/N) ratio of this magnetic recording system was 1.8. When the input/output signals of the magnetic head were processed, information of 680 Megabits could be read/written on/from the recording medium having 1 cm$^2$ under a head flying height of 70 nm. Moreover, the bit error number after the head seek test had been executed 50,000 times from the inner circumferential portion up to the outer circumferential portion was lower than or equal to 10 bits/plane. Further, 0.15 million hours of MTBF could be achieved. When the recording density was selected to be 340 Megabits per 1 cm$^2$, the information could be read/written with a head flying height of 110 nm, and then 0.30 million hours of MTBF could be achieved.

(EMBODIMENT 4)

Figure 7:
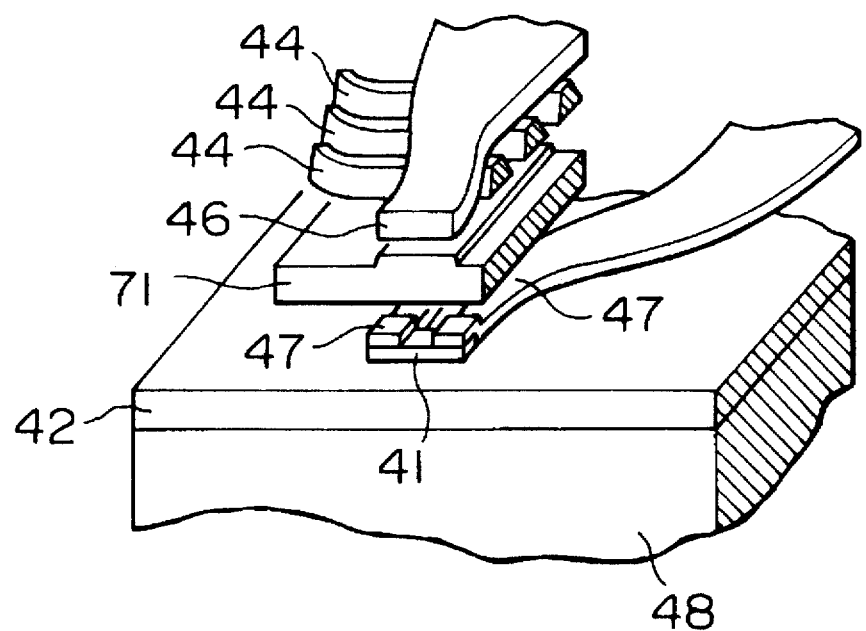
FIG. 7 is a perspective view illustrating another example of a sectional structure of a magnetic head employed in a magnetic recording system according to the present invention.

In a magnetic recording system with a similar structure to that of Embodiment 1, a magnetic recording medium was arranged by a multi-layered magnetic recording medium having the same structure as that of Embodiment 3, and a magnetic head was constructed of a read/write separate type magnetic head having a structure as shown in FIG. 7. Basically, this magnetic head owns the same structure as that of Embodiment 1 indicated in FIG. 4, but is different in that both the upper shield layer 43 and the lower recording magnetic pole 45 have been substituted by a single, common shield recording magnetic pole layer 71. This shield recording magnetic pole layer 71 was constructed such that roles of the upper shield layer as well as the lower recording magnetic pole are filled by a single soft magnetic layer. In this Embodiment 4, an Ni—Fe alloy film formed by sputtering was employed as this shield recording magnetic pole layer.

In particular, since such a magnetic head with the above-explained head structure was employed, an increase in the bit error rate occurred when the track density was selected to be higher than, or equal to 5 kTPI could be suppressed to the lower bit error rate. This is because the positioning errors of the writing head and the reading heat, caused by a yawing angle, when a rotary actuator is used, become small, and the distance between the writing head and the reading head becomes short. The overwrite characteristic of the magnetic recording medium could be improved by approximately 6 dB, as compared with that of Embodiment 3, since the Fe—Co—Ni alloy film formed by the plating method and whose saturated magnetic flux density was so high, i.e., 16,000 gauss, was utilized as the upper magnetic pole.

(EMBODIMENT 5)

Figure 8:
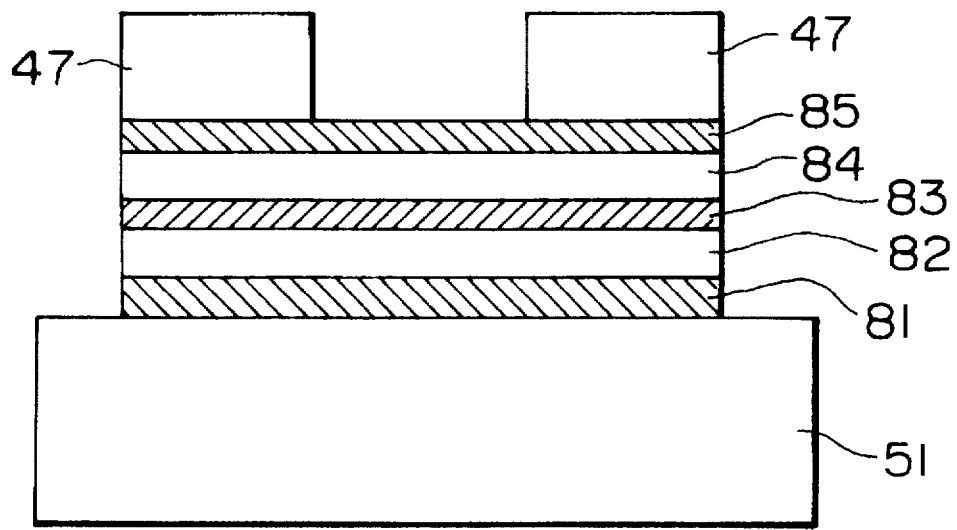
FIG. 8 schematically represents another example of a sectional structure of a magnetoresistive sensor portion of a magnetic head employed in a magnetic recording system according to the present invention.

In accordance with the present embodiment 5, in a magnetic recording system having a similar structure to that of Embodiment 1, a read/write separate type magnetic head having the same structure as that of Embodiment 4 and a reading magnetic head was constructed by employing a magnetoresistive sensor with a sectional structure as shown in FIG. 8. This magnetoresistive sensor utilizes a resistance variation (namely, magnetic resistance change caused by the spin-valve effect) caused by a change in the relative magnetizing direction between two magnetic layers separated from each other by the non-magnetic layer. A Ti layer having a thickness of 2 nm functioning as a buffer layer 81, an Ni-20 at % Fe alloy layer having a thickness of 3 nm functioning as a first magnetoresistive layer 82, a Cu layer having a thickness of 1.5 nm functioning as a non-magnetic layer 83, an Ni-20 at % Fe alloy layer having a thickness of 3 nm functioning as a second magnetoresistive layer 84, and a Fe-50 at % Mn alloy layer having a thickness of 5 nm functioning as an antiferromagnetic layer 85 were successively formed by sputtering on a gap layer 51 made of Al oxide between the shield layer and the magnetoresistive sensor. In this magnetoresistive sensor, magnetization of the second magnetoresistive layer is fixed along one direction by the exchange biasing field produced from the antiferromagnetic layer, and the magnetizing direction of the first magnetoresistive layer is changed by the leakage field produced from the medium, thereby changing resistance values. Since Ti is employed as the buffer layer, the crystal lattice planes (111) of the first and second magnetoresistive layers are oriented such that these lattice planes are located parallel to the film surfaces, so that the exchange interaction between the first and second magnetoresistive layers is weakened. As a consequence, the resultant efficiency of this magnetoresistive sensor becomes twice higher than that of the above-explained magnetoresistive sensor in Embodiment 1.

For the multi-layered magnetic recording medium of this Embodiment 5, a carbon substrate was employed having a diameter of 1.3 inches, a thickness of 0.4 mm, and surface roughness of 1 nm. A Cr underlayer having a thickness of 1 micron was formed on both surfaces of this carbon substrate by using the sputtering apparatus and forming conditions similar to those of Embodiment 1. Furthermore, the surfaces of the Cr underlayers were polished within a vacuum chamber by using a polishing tape containing a polishing agent of abrasive grains whose average diameter was less than 1 micron, so that textures were fabricated in these surfaces of the Cr underlayers along a direction substantially equal to the circumferential direction.

A Cr-10 at % Ti underlayer having a thickness of 50 nm was formed on the Cr underlayer with the texture. Furthermore, a Co-10 at % Cr-6 at % Pt layer having a thickness of 10 nm functioning as the first magnetic layer, a Cr intermediate layer having a thickness of 2.5 nm, a Co-16 at % Cr-4 at % Ta layer having a thickness of 11 nm functioning as the second magnetic layer were formed thereon. Moreover, an etching mask having an average distance of an opening portion selected to be greater than or equal to 50 microns and lower than or equal to 100 microns, was provided on the surface of the carbon protection layer, and the carbon protection layer of the unmasked region thereof was etched away by a depth of 15 nm by oxygen plasma etching. As a result, an island-shaped convex portion whose average diameter was greater than or equal to 50 microns and lower than or equal to 100 microns, and whose height was 15 nm, was fabricated on the surface of the carbon protection layer. Finally, a lubricant layer made of perfluoroalkylpolyether with an adsorptive characteristic was formed on this protection layer.

The average roughness factor Ra(θ) at the island-shaped convex portion of the protection layer formed in this magnetic recording medium was 0.8 nm, and the ratio of Ra(r) to Ra(θ) was 2.1. The coercivity Hc(θ) was 1970 Oersteds, the coercivity orientation degree was 0.32, and the product Brxt between residual magnetic flux density and total thickness of the magnetic layers was 112 gauss microns. The amount of Ar contained in the underlayer, the first and second magnetic layers, and the non-magnetic intermediate layer was less than 0.5 at %.

When the read/write characteristic was evaluated by employing the magnetic recording system according to this embodiment under such conditions that the height of the magnetic head slider was set to 0.36 mm, the head flying height was set to 70 nm, the linear recording density was selected to be 115 kBPI, and the track density was selected to be 5.2 kTPI, the signal-to-noise (S/N) ratio of this magnetic recording system was 2.2. This S/N ratio was higher than that of Embodiment 1, in which the first and second magnetic layers owned the same structures. When the input/output signals of the magnetic head were processed, information of 800 Megabits could be read/written on/from the recording medium having 1 cm² under a head flying height of 70 nm. Moreover, the bit error number after the head seek test had been executed 50,000 times from the inner circumferential portion up to the outer circumferential portion, was lower than or equal to 10 bits/plane. Further, 0.15 million hours of MTBF could be achieved. When the recording density was selected to be 400 Megabits per 1 cm² the information could be read/written with a head flying height of 110 nm, and then 0.30 million hours of MTBF could be achieved.

(EMBODIMENT 6)

Figure 9:
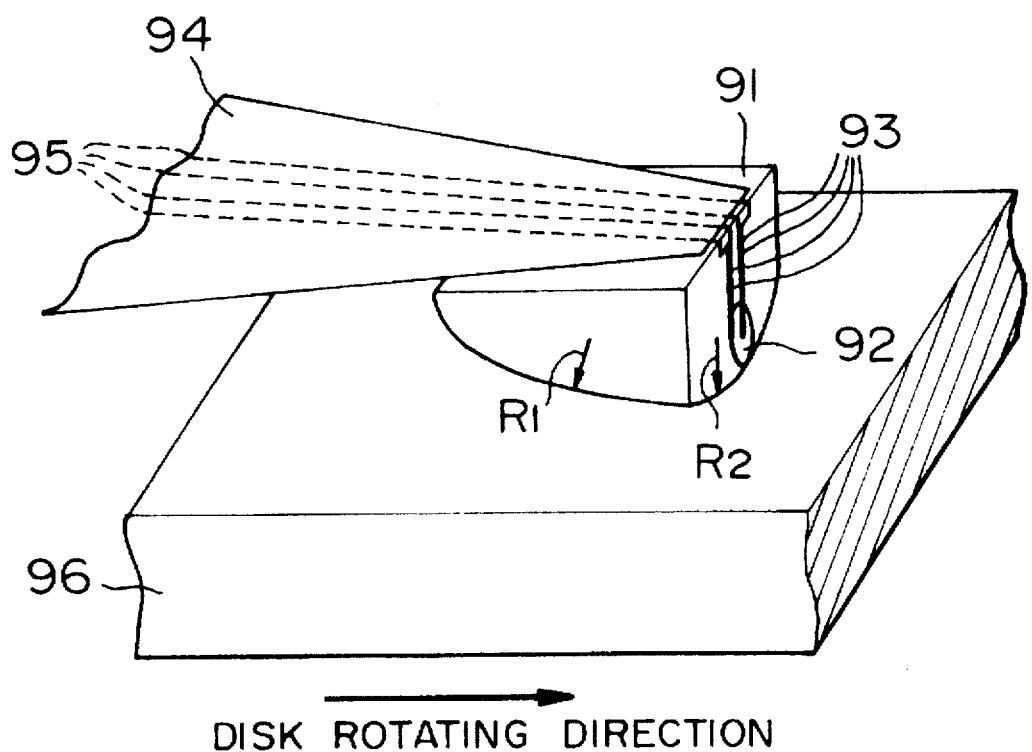
FIG. 9 is a perspective view for showing a peripheral portion of a magnetic head slider in an embodiment of the present invention.

In a magnetic recording system having a similar structure to that of Embodiment 1, a magnetic head was constructed of the read/write separate type magnetic head (reading/writing element) with the same structure as that of Embodiment 5, and then the resultant magnetic head was mounted on a fluid floating type magnetic head. In FIG. 9, there is shown a perspective view of a peripheral portion of this magnetic head slider according to this Embodiment 6. The magnetic head slider 91 is made of Al oxide-Ti carbide. A traveling surface with a curved surface and a rear edge surface with a plain surface of the magnetic slider were made by a machining process, and both a reading/writing element 92 and an electrode 93 for a wiring pattern were fabricated on the rear edge portion. This electrode 93 is a metal conductor made of an aluminum alloy, and was manufactured by vapor deposition and etching. Although not shown in this drawing, a protection layer made of Si/C/Si oxide was fabricated on the surface of this traveling plane of the magnetic head slider. A slider supporting mechanism 94 contains a flexible material such as polyimide. A very small and stable depressing weight of several tens of milligrams can be realized by such a small depressing direction spring coefficient as 0.1 milligram/micron, which cannot be realized with the conventional metal material. A wiring pattern 95 made of copper was fabricated on the surface of the supporting mechanism 94 by plating and etching. This wiring pattern is merely jointed with the magnetic head slider, so that it can be electrically connected with the above-explained electrode 93, and therefore, the wiring process of this embodiment can be considerably simplified as compared with the conventional wiring process.

Figure 10:
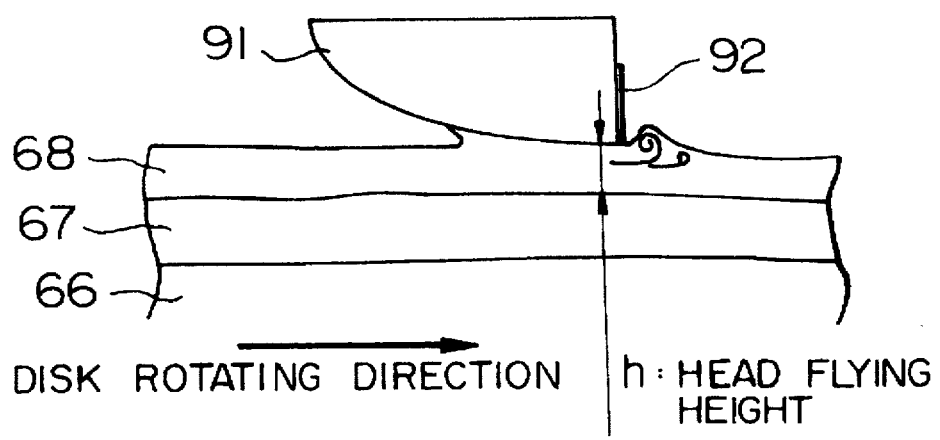
FIG. 10 is a side view for showing that the magnetic head slider is fluid-floated over a liquid lubricant agent in an embodiment of the present invention.

The magnetic head slider 91 is floating over the liquid lubricant agent on the uppermost surface of the magnetic disk. FIG. 10 is a side view for showing the magnetic head slider floating over the fluid lubricant agent. As previously described, the slider 91 owns the traveling plane having the curved surface, and also the rear edge surface having the plane surface along the travel direction, and a reading/writing element 92 is provided on this rear edge surface. In connection with the disk rotation, a fluid lubricant agent for constituting a lubricant layer 68 is intruded into a wedge-shaped space between the protection layer 67 functioning as the solid layer and the slider 91, whereby the pressure is increased. As a result, the magnetic head slider floats over the liquid by way of the so-called "air bearing principle". At this time, since air similarly flows from the peripheral portion of the liquid layer into this space, air dynamic lift for floating the slider and also adsorbing force caused by a meniscus around the contact portion are exerted, so that a preselected flying height can be obtained by balancing these exerted forces.

Since the traveling surface of the head slider is curved, and also the reading/writing element is arranged on the rear edge surface thereof, a stable floating characteristic can be realized by way of such a simple-shaped supporting mechanism without having the conventional rotary supporting mechanism. A curvature R1 of the slider traveling plane (namely, disk rotation direction) was set to 2 mm, and a curvature R2 along the seek direction was selected to be 1 mm.

For the multi-layered magnetic recording medium of this embodiment 6, a carbon substrate was employed having a diameter of 1.3 inches, a thickness of 0.4 mm, and surface roughness of 1 nm. Texture was formed on both surfaces of this carbon substrate by employing a manufacturing method similar to that of Embodiment 1. A Cr-10 at % Ti underlayer having a thickness of 30 nm was formed on the textured carbon substrate. Furthermore, a Co-14 at % Cr-8 at % Ni layer having a thickness of 9 nm functioning as the first magnetic layer, a Cr intermediate layer having a thickness of 1.5 nm, a Co-14 at % Cr-8 at % Ni layer having a thickness of 9 nm functioning as the second magnetic layer, and a carbon protection layer with a thickness of 20 nm were formed thereon under similar conditions to those of Embodiment 1. Finally, a lubricant layer having a thickness of 20 nm was formed on this carbon protection layer by using a lubricant agent obtained by diluting a lubricant agent belonging to the perfluoroalkylpolyether with polarity radial by solvent by 0.5%. The average roughness factor Ra(θ) of the protection layer formed in this magnetic recording medium was 0.7 nm, and the ratio of Ra(r) to Ra(θ) was 2.0. The coercivity Hc(θ) was 2200 Oersteds, the coercivity orientation degree was 0.12, and the product Br×t between residual magnetic flux density and total thickness of the magnetic layers was 80 gauss microns. The amount of Ar contained in the underlayer, the first and second magnetic layers, and the non-magnetic intermediate layer was less than 0.5 at %.

As the depressing weight is selected to be 35 mg, the stable liquid floating operation of the magnetic head with a head flying height of 30 nm could be realized, and further information of 4 Gbits per 1 inch$^2$ (linear recording density of 200 kBPI, and track density of 20 kTPI) could be written/read under a higher S/N ratio (the system S/N being 1.8).

(EMBODIMENT 7)

Figure 11:
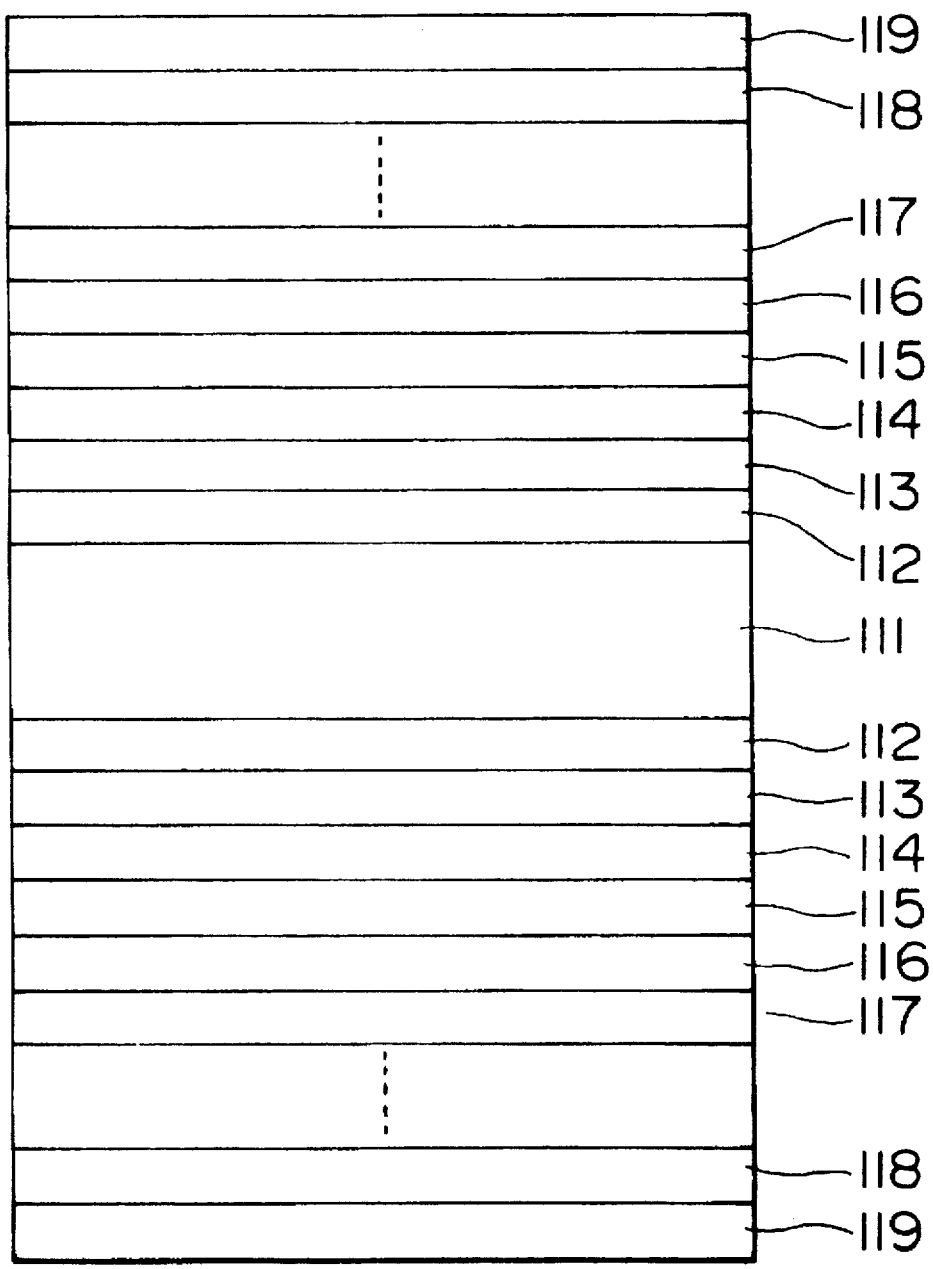
FIG. 11 schematically shows a sectional structure of a magnetic recording medium according to the present invention.

FIG. 11 is a sectional view for showing a multi-layered magnetic recording medium according to an embodiment 7 of the present invention. As a non-magnetic substrate 111, there are employed a reinforced glass substrate, a crystallized glass substrate, a ceramics substrate made of SiC or the like, an Ni—P plated Al alloy substrate, a plastic substrate, a boron substrate, a carbon substrate, or a Ti alloy substrate.

In FIG. 11, reference numeral 112 indicates a non-magnetic underlayer made of an alloy such as Cr—Ti, Mo—Nb, W—Ta, which contains Cr, Mo, W, Ta, Nb, as a major component, or otherwise made of any of these materials. Reference numeral 113 shows a magnetic layer made of such a magnetic alloy as CoCrPt, CoCrTa, CoNiPt, CoNiCr, CoSiTa, CoSiPt. Reference numeral 114 denotes a non-magnetic intermediate layer made of Cr, Mo, W, Ta, Nb, or otherwise such an alloy as Cr—V, Cr—Fe, Mo—Pt, Mo—Ge, W—Si, W—Cr, which contains any of these materials as a major component. Reference numeral 115 shows a magnetic layer made of such a magnetic alloy as CoCrPt, CoCrTa, CoNiPt, CoNiCr, CoSiTa, CoSiPt.

Reference numeral 116 denotes a non-magnetic intermediate layer made of Cr, Mo, W, Ta, Nb, or an alloy containing the above-described materials as a major component. Reference numeral 117 represents a magnetic layer made of a magnetic layer made of a magnetic alloy such as CoCrPt, CoCrTa, CoNiPt, CoNiCr, CoSiTa, CoSiPt. Subsequently, both the non-magnetic intermediate layer and the magnetic layer are further provided n times ("n" being 0, 1, 2, 3, - - - ). Reference numeral 118 indicates a protective layer made of C, WC, (WMo)C, (ZrNb)N, B$_4$C, carbon containing hydrogen. Finally, reference numeral 119 represents a lubricant layer made of perfluoroalkylpolyether.

It should be noted that to reduce an adverse influence caused by impurities or the like of the substrate surface, another non-magnetic layer may be provided between the substrate and the non-magnetic underlayer, which has been plasma-processed by Ar, or which is made of Nb, Ta, V, Ti, Zr, Hf, Ni—P, B, Al, Al$_2$O$_3$. Further, the non-magnetic underlayer film may be omitted. Also, the compositions and the film thicknesses of the respective layers may be varied as to the above-described magnetic layer and non-magnetic intermediate layer.

To set the product between residual magnetic flux density and total thickness of magnetic layer greater than or equal to 30 [G μm] and smaller than or equal to 150 [G μm], and also to set the coercivity greater than or equal to 1400 [Oe] and smaller than or equal to 3500 [Oe], the substrate temperature, the type of gas such as He, Ne, Ar, Kr, or Xe, the gas pressure, the bias voltage, and the supply power used during the sputtering process were adjusted, depending upon the compositions of the magnetic layer and the film construction.

The above-described multi-layered magnetic recording medium according to this embodiment 7 will now be explained in greater detail. Cr was formed in a film shape having a thickness of 50 nm as the non-magnetic underlayer on the non-magnetic substrate made of an Al alloy by way of a DC magnetron sputtering apparatus under such conditions that the substrate temperature was 300° C., the Ar gas pressure was 1.7 mTorr, the bias voltage was −200V, and density of supplied power was 5 W/cm$^2$. The above-explained non-magnetic substrate was constructed such that Ni—P was plated with a thickness of approximately 10 microns, and the surface thereof was polished in such a manner that an average roughness factor was selected from a range between 0.5 nm and 3 nm along the direction substantially equal to the circumferential direction, and an outer diameter of this Al alloy substrate was selected to be 95 nm. With employment of the above-described similar method, Co-16 at % Cr-4 at % Ta was formed as the magnetic layer in a film shape. Next, Cr was fabricated as the non-magnetic intermediate layer in a film shape having a thickness of 2.5 nm, and furthermore, Co-16 at % Cr-4 at % Ta was formed as the magnetic layer in a film shape.

Subsequently, the non-magnetic intermediate layer and the magnetic layer were sequentially formed in the film shapes n times ("n" being 0, 1, 2, 3, - - - ). At this time, the film thickness of the single magnetic layer was adjusted in order that the overall film thickness of the magnetic layer could become 30 nm. In other words, when the total number of magnetic layers was selected to be 3, the film thickness of each of these magnetic layers was 10 nm, whereas when the total number of the magnetic layers was selected to be 10, the thickness of each of these magnetic layers was 3 nm. Finally, after C was formed as the protective layer in a film shape having a thickness of 25 nm, the lubricant layer made of perfluoroalkylpolyether or the like was formed with a thickness of 5 nm.

As a comparison example 1, the magnetic recording medium, the magnetic layer number of which had been selected to be either 1 or 2, was manufactured under the same film forming conditions as that of the embodiment.

Figure 12:
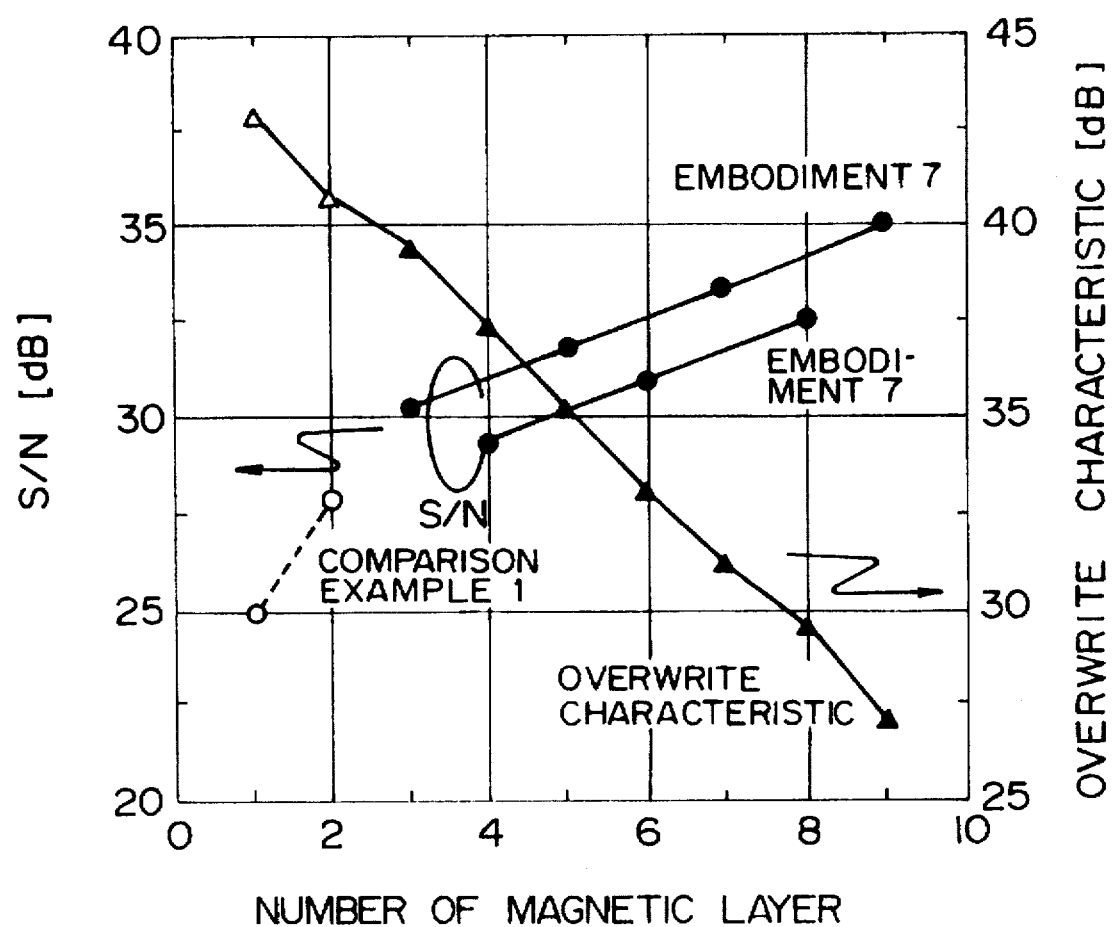
FIG. 12 graphically illustrates a comparison between the S/N ratio of a magnetic recording medium according to the present invention and the S/N ratio of the conventional magnetic recording medium.

The electromagnetic conversion characteristic of the thus-manufactured magnetic recording medium was evaluated by employing a think film magnetic head having a gap length of 0.4 micrometers, whose magnetic core portion was formed by an Ni—Fe alloy thin film, under such conditions that the relative speed was selected to the 12.5 m/s, and the linear recording density was selected to be 65 kFCI (kilo Flux Changes per Inch). The measurement results are represented in FIG. 12. From this measurement result graph, it may be understood that when the quantity of the magnetic layer is increased, the signal-to-noise (S/N) ratio is increased, and the improving rate thereof with respect to an odd total layer number is higher than that for an even total layer number. In particular, the noise reduction rate of the recording medium having the odd number of layers becomes higher than one having the even number of layers. On the other hand, the overwrite characteristic is deteriorated when the total layer number of the magnetic layers is increased. Thus, the optimum layer number should be designed by taking account of both the S/N ratio and the overwrite characteristic with respect to the magnetic recording medium.

Then, the product between residual magnetic flux density and total thickness of films was 135 [G μm] when the magnetic medium had 3 magnetic layers, and 125 [G μm] when the magnetic medium had 5 magnetic layers; and the coercivity was 1950 [Oe] in case of the 3 magnetic layers, 1780 [Oe] in case of the 5 magnetic layers. As to all other magnetic media according to this embodiment, the product between residual magnetic flux density and total thickness of films was greater than or equal to 30 [G μm] and smaller than or equal to 150 [G μm]; and the coercivity was greater than or equal to 140 [Oe] and smaller than or equal to 3500 [Oe].

It should also be noted that similar effects can be obtained when the compositions of the magnetic layers are changed to Co-14 at % Cr-6 at % Ta, Co-14 at % Cr-4 at % pt, Co-30 at % ni-5 at % pt, Co-20 at % Ni-10 at % Cr, Co-16 at % Si-4 at % Ta, and Co-18 at % Si-8 at % Pt. Furthermore, substantially the same result can be achieved when the compositions and the film thicknesses of the respective magnetic layers of the multi-layered magnetic recording media are varied or combined with each other.

(EMBODIMENT 8)

A multilayered magnetic recording medium was manufactured under a similar manufacturing method to that of the above-explained Embodiment 7 except that the biasing voltage was selected to be −300V. This multilayered magnetic recording medium owns a similar structure to that of the above-described Embodiment 7 except that a carbon substrate having an outer diameter of 1.8 inches was employed as the non-magnetic substrate, Zr having a thickness of 50 nm was provided between the non-magnetic substrate and the non-magnetic underlayer, and the magnetic layer was made of Co-16 at % Cr-4 at % Pt, whose layer number was selected to be 3, and moreover the film thickness of this non-magnetic intermediate layer was varied in a range between 0.1 nm and 5 nm inclusive. Note that the overall film thickness of the magnetic layer was selected to be 24 nm. Also, as another comparison example 2, another multilayered magnetic recording medium, in which a film thickness of a nonmagnetic intermediate layer was changed over 5 nm, was manufactured at the same time. The overwrite characteristics of these multilayered magnetic recording media were evaluated under similar conditions as those of Embodiment 7. The measurement results are indicated in FIG. 13.

It should be noted that the magnetic recording medium in which the film thickness of the non-magnetic intermediate layer was 0.1 nm could be manufactured by such a manner than after the magnetic layer had been formed with a thickness of 8 nm, the film forming operation was stopped, and thereafter the magnetic layer was formed with a thickness of 8 nm; and a series of these manufacturing steps were repeated, resulting in the overall thickness of the magnetic layers of 24 nm. At this time, essentially speaking, non-magnetic intermediate layers mainly made of oxide and each having a thickness of 0.1 nm approximately were fabricated among the magnetic layers. At this time, this layer may be either a layer containing nitrogen or a layer containing carbon by varying the film forming atmosphere.

Figure 13:
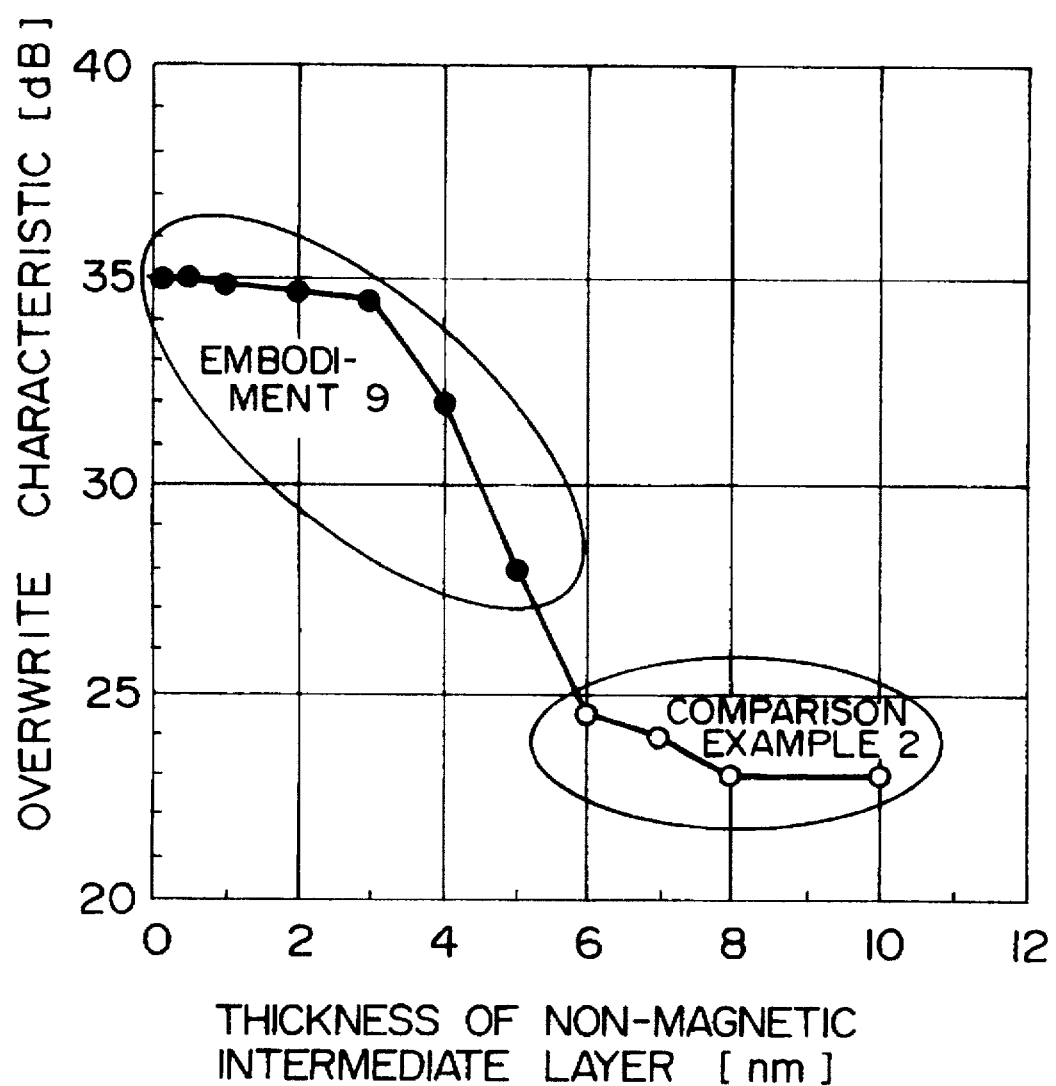
FIG. 13 graphically represents a comparison between the overwrite characteristic of a magnetic recording medium according to the present invention and the overwrite characteristic of the conventional magnetic recording medium.

From a graphic representation of FIG. 13, it may be understood that the overwrite characteristic of such a magnetic recording medium according to this embodiment, in which the film thickness of the non-magnetic intermediate layer was greater than or equal to 0.1 nm and smaller than or equal to 5 nm, was considerably improved, as compared with that of the recording medium of the comparison example. This is caused by essentially weakening the recording magnetic field, since the effective film thickness of the magnetic layers including the film thickness of the non-magnetic intermediate layer would be made excessively thick in the recording medium in which the film thickness of the non-magnetic intermediate layer would be thicker than 5 nm. In case no non-magnetic underlayer is provided, a similar effect can be obtained, as when the non-magnetic underlayer and the non-magnetic intermediate layer are replaced by Mo, W, Ta, Nb, Cr—Ti, Cr—Mo, W—Ta, and Mo—V.

(EMBODIMENT 9)

A multilayered magnetic recording medium was manufactured under a similar manufacturing method to that of the above-explained Embodiment 7 except that the biasing voltage was selected to be −400V. This multilayered magnetic recording medium owns a similar structure to that of the above-described Embodiment 7 except that a carbon substrate having an outer diameter of 2.5 inches was employed as the non-magnetic substrate, the magnetic layer was made of Co-20 at % Cr-5 at % Ta with a layer number selected to be 3, and moreover the film thickness of the non-magnetic intermediate layer was varied in a range between 0.1 nm and 5 nm inclusive. It should be noted that the overall film thickness of the magnetic layers had been adjusted in the respective media in order that the product between residual magnetic flux density and total thickness of recording films was changed in a range between 10 and 150 G μm. In other words, when the film thicknesses of the respective magnetic layers were selected from 5.2 nm to 5.3 nm, and thus the overall film thickness was selected to be 26.3 nm, the multilayered magnetic recording medium having the product between the residual magnetic flux density and the total thickness of recording film layers of 100 [G μm] could be obtained.

Even when the film thickness of the magnetic layer is varied, a change in the residual magnetization becomes very small, and the product between the residual magnetic flux density and the total thickness of the magnetic film layers will be varied substantially proportional to the overall film thickness. For example, when the film thickness of each magnetic layer was selected to be approximately 0.5 nm and then the overall film thickness was 2.6 nm, a multilayered magnetic recording medium having the product of 10 [G μm] could be obtained, and when the film thickness of each magnetic layer was selected to be approximately 8 nm and then the overall film thickness thereof was 2.6 nm, a multilayered magnetic recording medium having the product of 150 [G μm] could be obtained.

As another comparison example 3, a multilayered magnetic recording medium whose product between the residual magnetic flux density and the total thickness of the magnetic film layers was a value smaller than 10 [G μm] or greater than 150 [G μm] was manufactured at the same time.

Figure 14:
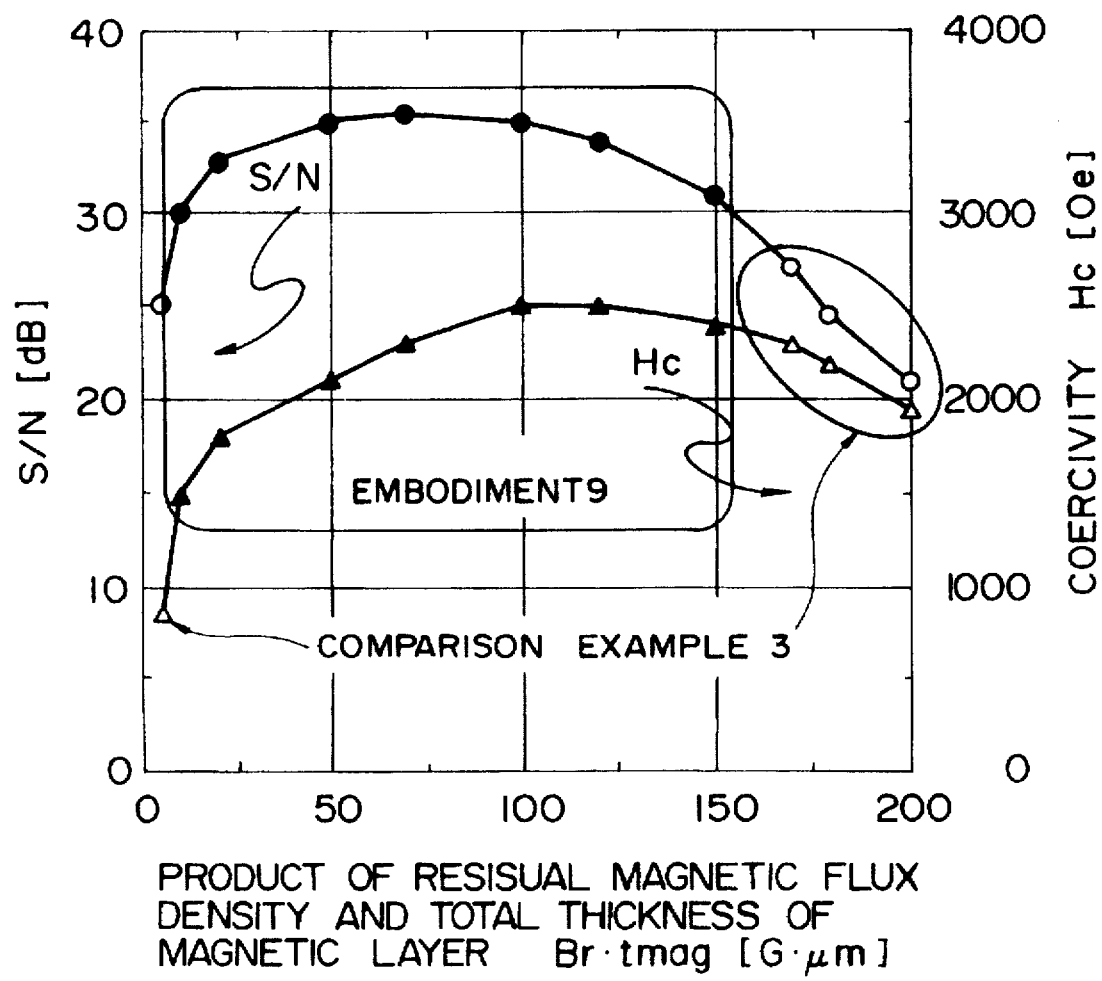
FIG. 14 graphically shows a comparison between the S/N ratio/coercive force of a magnetic recording medium according to the present invention, and those of the conventional magnetic recording medium.

These recording media were evaluated under similar conditions to those of Embodiment 7. A relationship among the S/N ratio, coercivity, and product between residual magnetic flux density and total thickness of recording film layers is represented in FIG. 14. From this graphic representation of FIG. 14, the magnetic recording media whose product between residual magnetic flux density and total thickness of magnetic film layers is in a range from 10 to 150 [G μm] are seen to have higher S/N ratios than that of the comparison example. The coercivities of any of these magnetic recording media located within this range are higher than, or equal to 1400 [Oe].

Even when the compositions of the magnetic film are changed to Co-14 at % Cr-6 at % Ta, Co-14 at % Cr-4 at % Pt, Co-20 at % Ni-10 at % Cr, Co-16 at % Si-4 at % Ta, and Co-18 at % Si-8 at % Pt in a similar manner to that of Embodiment 7, the values of coercivity as to the magnetic recording media whose products between residual magnetic flux density and total thickness of magnetic film layers were within a range between 10 to 150 [G μm] were greatly varied. However, these values of coercivity were greater than or equal to 1400 [Oe], and smaller than or equal to 3500 [Oe].

To achieve better S/N ratios, at least the coercivity should be maintained greater than 1400 [Oe]. However, when the coercivity of a magnetic recording medium is increased higher than 3500 [Oe], the overwrite characteristic thereof is deteriorated. Accordingly, such a higher coercivity deteriorates the overall characteristics of this magnetic recording medium. Furthermore, it is required that the product between the residual magnetic flux density and the total thickness of the magnetic recording layers be within a range between 10 and 150 [G μm], since the read output was excessively low, and a high S/N ratio would not be obtained otherwise. To the contrary, in the recording media whose product value exceeded 150 [G μm], the ratio of the read output signal obtained during the high-density magnetic recording to the read output signal obtained during the low-density magnetic recording (namely, resolution) was considerably deteriorated.

(EMBODIMENT 10)

Figure 15:
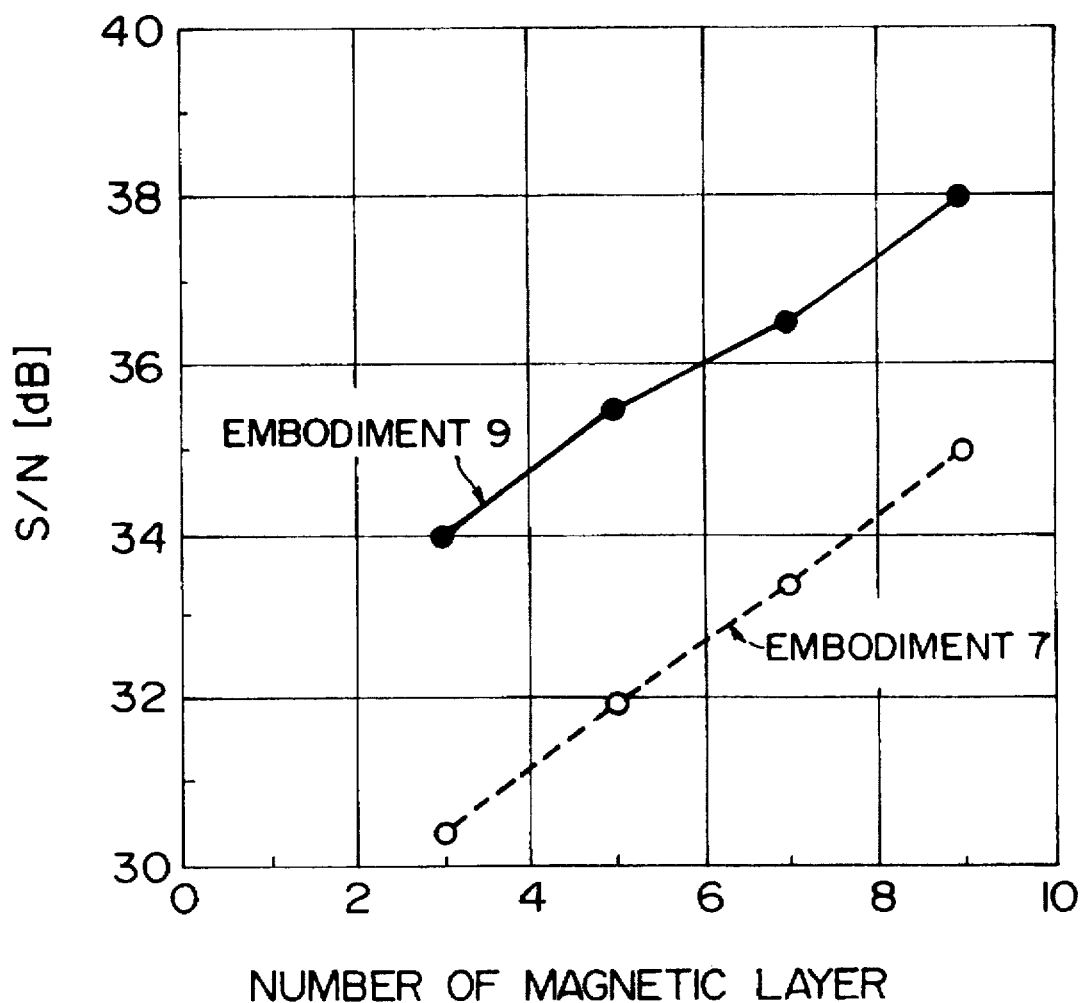
FIG. 15 graphically illustrates the S/N ratio that results by combining a magnetic recording medium according to the present invention and an MR head.

With respect to the multi-layered magnetic recording medium of the previous Embodiment 7, an electromagnetic conversion characteristic is represented in FIG. 15 when this multi-layered magnetic recording medium is evaluated by employing the magnetic head having the MR element for read back operation, and the circuit for correcting the asymmetrical characteristic of the waveform of this read back signal. As can be seen from the graphic representation of FIG. 15, the electromagnetic conversion characteristic of the recording medium according to this embodiment 10 can be greatly improved even though the same recording medium is employed, because the read output of this recording medium is higher than that of the previously explained recording medium, as shown in FIG. 12, in which the self read/write operation is carried out.

(EMBODIMENT 11)

Figure 16A:
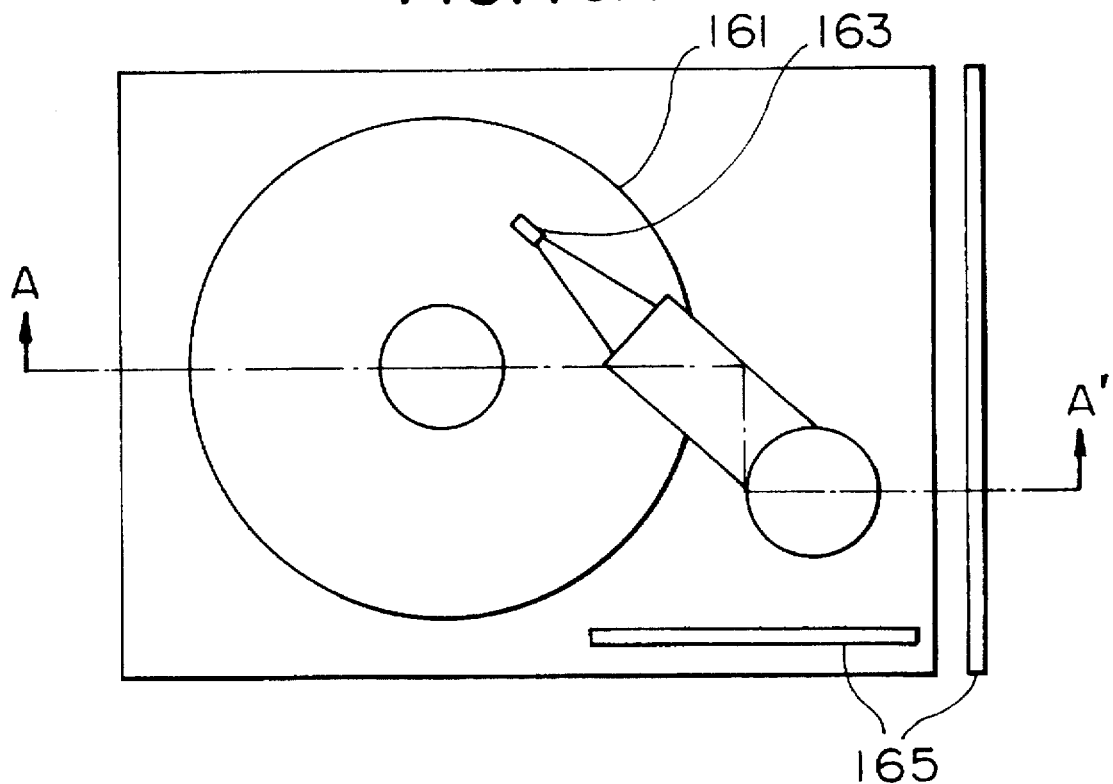
FIGS. 16A and 16B schematically represent an upper surface and a sectional structure of a magnetic recording system according to the present invention.
Figure 16B:
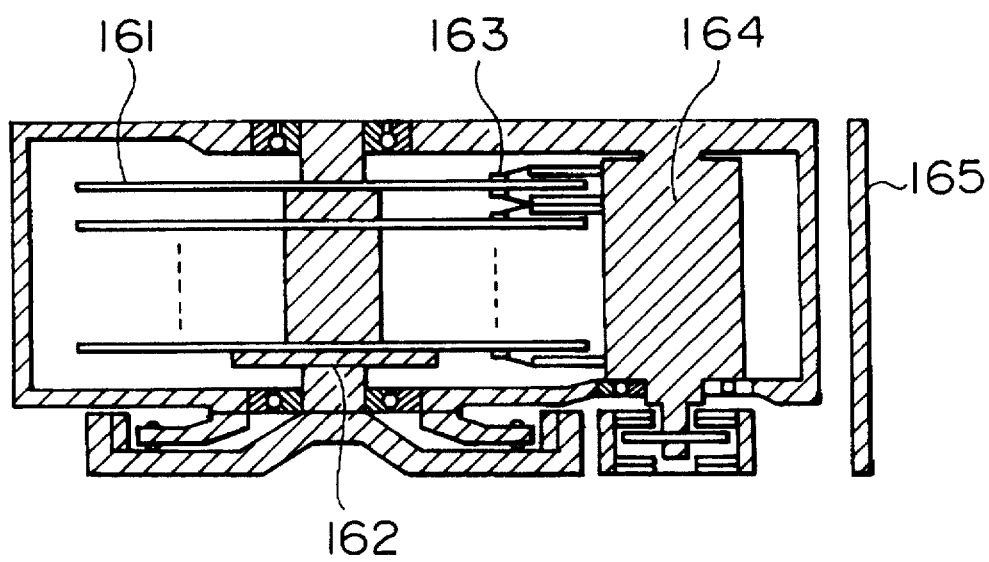

FIG. 16A is an upper view schematically illustrating one example of a magnetic recording system according to the present invention, and FIG. 16B is a sectional view of this magnetic recording system, taken along a line A–A' of FIG. 16A. Each of magnetic recording media 161 is supported by a supporting member coupled to a magnetic recording medium driving unit 162. Magnetic heads 163 are arranged opposite to the respective surfaces of the magnetic recording media. The magnetic heads are driven by a magnetic head driving unit 164 in response to a read/write signal processing system 165 containing a signal processing LSI by most likelihood decoding.

As the magnetic head, a thin film magnetic head having a gap length of 0.4 micrometers is employed. The thin film magnetic head is combined with the magnetic recording medium of the respective embodiments, as previously explained, thereby to constitute the magnetic recording system. As a result, a high-capacity magnetic recording system having a recording capacity approximately 1.5 times higher than that of the conventional magnetic recording system is obtained. When no most likelihood decoding LSI is employed in the read/write signal processing system, the resultant recording capacity is at lost 1.5 times higher than that of the conventional magnetic recording system.

In case that a metal-in-gap head is employed as this magnetic head, in which an Fe—Al—Si alloy thin film is used as a tip portion of the Ni—Fe magnetic pole, a magnetic recording system having a recording capacity approximately 1.2 times higher than that of the conventional magnetic recording system can be obtained. Furthermore, such a high-capacity magnetic recording system can be realized in such a manner that the magnetic head is used as the read/write separating head, a MR head being employed as the read back head, and this head is combined with the circuit for correcting asymmetrical characteristics for the positive and negative waveforms of the read output signal less than 10%. The recording capacity of the system is about two times higher than that of the conventional magnetic recording system. When such an output signal asymmetry correcting circuit is not employed, the recording capacity of this magnetic recording system is at lost 1.5 times higher than that of the conventional magnetic recording system.

Although the above-explained embodiments have been described as to the disk-shaped magnetic recording system with employment of such disk-shaped magnetic recording media, the present invention is not limited to these embodiments, but may be applied to, for instance, either a tape-shaped recording medium, or a card-shaped recording medium, which has a magnetic recording layer only on one surface, and also to a magnetic recording system utilizing such a tape-shaped or card-shaped recording medium.

It should also be noted that the film forming method of the magnetic recording media according to the present invention is not restricted to the above-explained sputtering method, but may be realized by utilizing any of the ion beam sputtering method, the plasma CVD method, the coating method, the plating method, and so on.

In accordance with the present invention, since the high S/N ratio of the recording medium, the stable had floating characteristic due to small concave/convex characteristics of the surface of the magnetic recording medium, and the high-graded head positioning servo signals can be obtained, MTBF longer than 0.15 million hours can be realized under a high recording density of 600M bits/cm$^2$. When the recording density is selected to be 300M bits/cm$^2$, MTBF longer than 0.30 million hours can be realized. Moreover, according to another advantage of the present invention, since both the disk substrates and the magnetic head sliders can be packaged, or mounted at high density, a compact magnetic recording system with a large recording capacity can be obtained.

What is claimed is:

1. A multi-layered magnetic recording medium comprising:

a non-magnetic substrate; and an alternating arrangement constituted by a plurality of magnetic layers and a non-magnetic intermediate layer between each pair of successive magnetic layers, formed on the non-magnetic substrate;

wherein the coercivity Hc(θ) of said multi-layered magnetic recording medium, which is measured by applying a magnetic field along a direction substantially parallel to a traveling direction of a magnetic head with respect to said magnetic recording medium during a writing operation, is greater than the coercivity Hc(r) of said multi-layered magnetic recording medium, which is measured by applying a magnetic field along a direction substantially perpendicular to the traveling direction of said magnetic head with respect to said multi-layered recording medium and parallel to a major surface of said multi-layered recording medium.

2. A multi-layered magnetic recording medium as claimed in claim 1, wherein the coercivity Hc(θ) measured by applying the magnetic field along the direction substantially parallel to the traveling direction of the magnetic head is greater than or equal to 1,400 Oersteds.

3. A multi-layered magnetic recording medium as claimed in claim 1, wherein a composition of at least one of said plurality of magnetic layers is different from compositions of the magnetic layers other than said one of said plurality of magnetic layers.

4. A multi-layered magnetic recording medium as claimed in claim 1, wherein at least one of said plurality of magnetic layers has a Co concentration that is different from that of the magnetic layers other than said at least one of said plurality of magnetic layers.

5. A multi-layered magnetic recording medium as claimed in claim 1, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

6. A multi-layered magnetic recording medium as claimed in claim 1, further comprising underlayers on the non-magnetic substrate.

7. A multi-layered magnetic recording medium as claimed in claim 6, wherein said underlayers and said non-magnetic intermediate layer each contain Cr, Mo, or W as a major component, and said magnetic layers are constructed of an alloy containing Co as a major component.

8. A multi-layered magnetic recording medium as claimed in claim 6, wherein said underlayers, magnetic layers, and non-magnetic intermediate layer have respective Ar concentrations that are lower than or equal to 2.0 at %.

9. A multi-layered magnetic recording medium as claimed in claim 6, wherein said underlayers are constructed of at least two non-magnetic layers, and one underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

10. A multi-layered magnetic recording medium comprising:

a non-magnetic substrate; and an alternating arrangement constituted by a plurality of magnetic layers and a non-magnetic intermediate layer between each pair of successive magnetic layers, formed on the non-magnetic substrate;

wherein both of the coercivity Hc(θ) of said multi-layered magnetic recording medium, which is measured by applying a magnetic field along a direction substantially parallel to a traveling direction of a magnetic head with respect to said magnetic recording medium during a writing operation, and the coercivity Hc(r) of said multi-layered magnetic recording medium, which is measured by applying a magnetic field along a direction substantially perpendicular to the traveling direction of said magnetic head with respect to said multi-layered recording medium and parallel to a major surface of said multi-layered recording medium, are within a range for satisfying the following relationship:

$$0.05 \leq \{Hc(\theta) - Hc(r)\}/\{Hc(\theta) + Hc(r)\} \leq 0.6.$$

11. A multi-layered magnetic recording medium as claimed in claim 10, wherein the coercivity Hc(θ) measured by applying the magnetic field along the direction substantially parallel to the traveling direction of the magnetic head is greater than or equal to 1,400 Oersteds.

12. A multi-layered magnetic recording medium as claimed in claim 10, wherein a composition of at least one of said plurality of magnetic layers is different from compositions of the magnetic layers other than said at least one of said plurality of magnetic layers.

13. A multi-layered magnetic recording medium as claimed in claim 10, wherein a composition of at least one of said plurality of magnetic layers is different from compositions of the magnetic layers other than said at least one of said plurality of magnetic layers.

14. A multi-layered magnetic recording medium as claimed in claim 10, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

15. A multi-layered magnetic recording medium as claimed in claim 10, further comprising underlayers on the non-magnetic substrate.

16. A multi-layered magnetic recording medium as claimed in claim 15, wherein said underlayers and said non-magnetic intermediate layer each contain Cr, Mo, or W as a major component, and said magnetic layers are constructed of an alloy containing Co as a major component.

17. A multi-layered magnetic recording medium as claimed in claim 15, wherein said underlayers, magnetic layers, and non-magnetic intermediate layer have respective Ar concentrations that are lower than or equal to 2.0 at %.

18. A multi-layered magnetic recording medium as claimed in claim 15, wherein said underlayers are constructed of at least two non-magnetic layers, and one underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

19. A multi-layered magnetic recording medium comprising:
a non-magnetic substrate; and
an alternating arrangement constituted by a plurality of magnetic layers and a non-magnetic intermediate layer between each pair of successive magnetic layers, formed on the non-magnetic substrate;
wherein an average roughness factor Ra(r) of a surface of said magnetic recording medium, which is measured along a direction substantially normal to a traveling direction of a magnetic head with respect to said magnetic recording medium during a writing operation, is greater than or equal to 0.1 nm and smaller than or equal to 5 nm, and a ratio of said average roughness factor Ra(r) to another average roughness factor Ra(θ) of the surface of the magnetic recording medium, which is measured along a direction substantially parallel to said traveling direction of said magnetic head Ra(r)/Ra(θ), is greater than or equal to 1.1 and smaller than or equal to 5.0.

20. A multi-layered magnetic recording medium as claimed in claim 19, wherein the coercivity Hc(θ) measured by applying the magnetic field along the direction substantially parallel to the traveling direction of the magnetic head is greater than or equal to 1,400 Oersteds.

21. A multi-layered magnetic recording medium as claimed in claim 19, wherein a composition of at least one of said plurality of magnetic layers is different from compositions of the magnetic layers other than said at least one of said plurality of magnetic layers.

22. A multi-layered magnetic recording medium as claimed in claim 19, wherein at least one of said plurality of magnetic layers has a Co concentration that is different from that of the magnetic layers other than said at least one of said plurality of magnetic layers.

23. A multi-layered magnetic recording medium as claimed in claim 13, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

24. A multi-layered magnetic recording medium as claimed in claim 19, further comprising underlayers on the non-magnetic substrate.

25. A multi-layered magnetic recording medium as claimed in claim 24, wherein said underlayers and said non-magnetic intermediate layer each contain Cr, Mo, or W as a major component, and said magnetic layers are constructed of an alloy containing Co as a major component.

26. A multi-layered magnetic recording medium as claimed in claim 24, wherein said underlayers, magnetic layers, and non-magnetic intermediate layer have respective Ar concentrations that are lower than or equal to 2.0 at %.

27. A multi-layered magnetic recording medium as claimed in claim 24, wherein said underlayers are constructed of at least two non-magnetic layers, and one underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

28. A multi-layered magnetic recording medium comprising:
a non-magnetic substrate; and
an alternating arrangement constituted by a plurality of magnetic layers and a non-magnetic intermediate layer between each pair of successive magnetic layers, formed on the non-magnetic substrate;
wherein a product (Br×t) between a total thickness (t) of said plurality of magnetic layers and residual magnetic flux density (Br), which is measured by applying a magnetic field along a direction substantially parallel to a traveling direction of a magnetic head with respect to said magnetic recording medium during a writing operation, is greater than or equal to 30 gauss micrometers, and smaller than or equal to 280 gauss micrometers.

29. A multi-layered magnetic recording medium as claimed in claim 28, wherein the coercivity Hc(θ) measured by applying the magnetic field along the direction substantially parallel to the traveling direction of the magnetic head is greater than or equal to 1,400 Oersteds.

30. A multi-layered magnetic recording medium as claimed in claim 28, wherein a composition of at least one of said plurality of magnetic layers is different from compositions of the magnetic layers other than said at least one of said plurality of magnetic layers.

31. A multi-layered magnetic recording medium as claimed in claim 28, wherein at least one of said plurality of magnetic layers has a Co concentration that is different from that of the magnetic layers other than said at least one of said plurality of magnetic layers.

32. A multi-layered magnetic recording medium as claimed in claim 28, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

33. A multi-layered magnetic recording medium as claimed in claim 22, further comprising underlayers on the non-magnetic substrate.

34. A multi-layered magnetic recording medium as claimed in claim 33, wherein said underlayers and said non-magnetic intermediate layer each contain Cr, Mo, or W as a major component, and said magnetic layers are constructed of an alloy containing Co as a major component.

35. A multi-layered magnetic recording medium as claimed in claim 33, wherein said underlayers, magnetic layers, and non-magnetic intermediate layer have respective Ar concentrations that are lower than or equal to 2.0 at %.

36. A multi-layered magnetic recording medium as claimed in claim 33, wherein said underlayers are constructed of at least two non-magnetic layers, and one underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

37. A magnetic recording system comprising:
   at least one magnetic recording medium;
   a driving unit for driving said magnetic recording medium along a writing direction;
   a magnetic head including a writing portion and a reading portion;
   means for relatively moving said magnetic head with respect to said magnetic recording medium; and
   a read/write signal processing means for inputting a signal into said magnetic head and for reading back a signal outputted from said magnetic head;
   wherein at least one of said at least one magnetic recording media is a multi-layered magnetic recording medium having an alternating arrangement constituted by a plurality of magnetic layers and a non-magnetic intermediate layer between each pair of successive magnetic layers, formed on a non-magnetic substrate; and
   wherein the coercivity Hc(θ) of said multi-layered magnetic recording medium, which is measured by applying a magnetic field along a direction substantially parallel to a traveling direction of a magnetic head with respect to said magnetic recording medium during a writing operation, is greater than the coercivity Hc(r) of said multi-layered magnetic recording medium, which is measured by applying a magnetic field along a direction substantially perpendicular to the traveling direction of said magnetic head with respect to said multi-layered magnetic recording medium and parallel to a major surface of said multi-layered magnetic recording medium.

38. A magnetic recording system as claimed in claim 37, wherein said reading portion of said magnetic head includes a magnetoresistive sensor having an alternating arrangement of a plurality of conductive magnetic layers and a conductive non-magnetic layer between each pair of successive conductive magnetic layers, and wherein resistances of said conductive magnetic layers are changed when mutual magnetizing directions are relatively varied by an external magnetic field.

39. A magnetic recording system as claimed in claim 37, wherein the coercivity Hc(θ) measured by applying the magnetic field along the direction substantially parallel to the traveling direction of the magnetic head is greater than or equal to 1,400 Oersteds.

40. A magnetic recording system as claimed in claim 37, wherein a height of a magnetic head slider for holding said magnetic head and for floating said magnetic head with respect to said magnetic recording medium is smaller than or equal to 0.5 mm, and a thickness of said substrate is smaller than or equal to 0.6 mm.

41. A magnetic recording system as claimed in claim 37, wherein either linear recording density of said magnetic recording medium is higher than or equal to 100 kFCI, or recording track density of said magnetic recording medium is higher than or equal to 4 kTPI.

42. A magnetic recording system as claimed in claim 27, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

43. A magnetic recording system as claimed in claim 37, wherein said at least one of the magnetic recording media further comprises an underlayer on the non-magnetic substrate.

44. A magnetic recording system as claimed in claim 43, wherein said underlayer and said non-magnetic intermediate layer each contain Cr, Mo, or W as a major component, and said magnetic layers are constructed of an alloy containing Co as a major component.

45. A magnetic recording system as claimed in claim 43, wherein said underlayer, magnetic layers, and non-magnetic intermediate layer have respective Ar concentrations that are lower than or equal to 2.0 at %.

46. A magnetic recording system as claimed in claim 43, wherein said underlayer of said magnetic recording medium is constructed of at least two non-magnetic layers, and one of said at least two non-magnetic layers of said underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

47. A magnetic recording system comprising:
   a magnetic recording medium;
   a driving unit for driving said magnetic recording medium along a writing direction;
   a magnetic head including a writing portion and a reading portion;
   means for relatively moving said magnetic head with respect to said magnetic recording medium; and
   read/write signal processing means for inputting a signal into said magnetic head and for reading back a signal outputted from said magnetic head;
   wherein the reading portion of said magnetic head includes a magnetoresistive head;
   said magnetic recording medium is a multi-layered magnetic recording medium having an alternating arrangement constituted by a plurality of magnetic layers and a non-magnetic intermediate layer between each pair of successive magnetic layers, formed on a non-magnetic substrate; and
   the coercivity Hc(θ) of said magnetic recording medium, which is measured by applying a magnetic field along a direction substantially parallel to a traveling direction of a magnetic head with respect to said magnetic recording medium during a writing operation, is greater than the coercivity Hc(r) of said multi-layered magnetic recording medium, which is measured by applying a magnetic field along a direction substantially perpendicular to the traveling direction of said magnetic head with respect to said multi-layered magnetic recording medium and parallel to a major surface of said multi-layered magnetic recording medium.

48. A magnetic recording system as claimed in claim 47, wherein said reading portion of said magnetic head includes a magnetoresistive sensor having an alternating arrangement of a plurality of conductive magnetic layers and a conductive non-magnetic layer between each pair of successive magnetic layers, and resistances of said conductive magnetic layers are changed when mutual magnetizing directions are relatively varied by an external magnetic field.

49. A magnetic recording system as claimed in claim 47, wherein the coercivity Hc(θ) measured by applying the magnetic field along the direction substantially parallel to the traveling direction of the magnetic head is greater than or equal to 1,400 Oersteds.

50. A magnetic recording system as claimed in claim 47, wherein a height of a magnetic head slider for holding said magnetic head and for floating said magnetic head with respect to said magnetic recording medium is smaller than or equal to 0.5 mm, and a thickness of said substrate is smaller than or equal to 0.6 mm.

51. A magnetic recording system as claimed in claim 47, wherein either linear recording density of said magnetic recording medium is higher than or equal to 100 kFCI, or recording track density of said magnetic recording medium is higher than or equal to 4 kTPI.

52. A magnetic recording system as claimed in claim 47, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

53. A magnetic recording system as claimed in claim 47, wherein said magnetic recording medium further comprises an underlayer on the non-magnetic substrate.

54. A magnetic recording system as claimed in claim 53, wherein said underlayer and said non-magnetic intermediate layer each contain Cr, Mo, or W as a major component, and said magnetic layers are constructed of an alloy containing Co as a major component.

55. A magnetic recording system as claimed in claim 53, wherein said underlayer, magnetic layers, and non-magnetic intermediate layer have respective Ar concentrations that are lower than or equal to 2.0 at %.

56. A magnetic recording system as claimed in claim 53, wherein said underlayer of said magnetic recording medium is constructed of at least two non-magnetic layers, and one of said at least two non-magnetic layers of said underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

57. A magnetic recording system comprising:

a magnetic recording medium;

a driving unit for driving said magnetic recording medium along a writing direction;

a magnetic head including a writing portion and a reading portion;

means for relatively moving said magnetic head with respect to said magnetic recording medium; and read/write signal processing means for inputting a signal into said magnetic head and for reading back a signal outputted from said magnetic head;

wherein the reading portion of said magnetic head includes a magnetoresistive head;

said magnetic recording medium is arranged by a multi-layered magnetic recording medium having an alternating arrangement constituted by a plurality of magnetic layers and a non-magnetic intermediate layer between each pair of successive magnetic layers, formed on a non-magnetic substrate; and both of the coercivity Hc(θ) of said magnetic recording medium, which is measured by applying a magnetic field along a direction substantially parallel to a traveling direction of a magnetic recording medium during a writing operation, and the coercivity Hc(r) of said multi-layered magnetic recording medium, which is measured by applying a magnetic field along a direction substantially perpendicular to the traveling direction of said magnetic head with respect to said multi-layered magnetic recording medium and parallel to a major surface of said multi-layered magnetic recording medium, satisfy the following relationship:

$$0.5 \leq \{Hc(\theta)-Hc(r)\}/\{Hc(\theta)+Hc(r)\} \leq 0.6.$$

58. A magnetic recording system as claimed in claim 57, wherein said reading portion of said magnetic head includes a magnetoresistive sensor having an alternating arrangement of a plurality of conductive magnetic layers and a conductive non-magnetic layer between each pair of successive magnetic layers, and resistances of said conductive magnetic layers are changed when mutual magnetizing directions are relatively varied by an external magnetic field.

59. A magnetic recording system as claimed in claim 57, wherein the coercivity Hc(θ) measured by applying the magnetic field along the direction substantially parallel to the traveling direction of the magnetic head is greater than or equal to 1,400 Oersteds.

60. A magnetic recording system as claimed in claim 57, wherein a height of a magnetic head slider for holding said magnetic head and for floating said magnetic head with respect to said magnetic recording medium is smaller than or equal to 0.5 mm, and a thickness of said substrate is smaller than or equal to 0.6 mm.

61. A magnetic recording system as claimed in claim 57, wherein either linear recording density of said magnetic recording medium is higher than or equal to 100 kFCI, or recording track density of said magnetic recording medium is higher than or equal to 4 kTPI.

62. A magnetic recording system as claimed in claim 57, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

63. A magnetic recording system as claimed in claim 57, wherein said magnetic recording medium further comprises an underlayer on the non-magnetic substrate.

64. A magnetic recording system as claimed in claim 63, wherein said underlayer and said non-magnetic intermediate layer each contain Cr, Mo, or W as a major component, and said magnetic layers are constructed of an alloy containing Co as a major component.

65. A magnetic recording system as claimed in claim 63, wherein said underlayer, magnetic layers, and non-magnetic intermediate layer have respective Ar concentrations that are lower than or equal to 2.0 at %.

66. A magnetic recording system as claimed in claim 63, wherein said underlayer is constructed of at least two non-magnetic layers, and one of said at least two non-magnetic layers of said underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

67. A magnetic recording system comprising:
a magnetic recording medium;
a driving unit for driving said magnetic recording medium along a writing direction;
a magnetic head constructed of a writing portion and a reading portion;
means for relatively moving said magnetic head with respect to said magnetic recording medium; and
read/write signal processing means for inputting a signal into said magnetic head and for reading back a signal outputted from said magnetic head;
wherein the reading portion of said magnetic head includes a magnetoresistive head;
said magnetic recording medium is a multi-layered magnetic recording medium having an alternating arrangement constituted by a plurality of magnetic layers and a non-magnetic intermediate layer between each pair of successive magnetic layers, formed on a non-magnetic substrate;
an average roughness factor Ra(r) of a surface of said magnetic recording medium, which is measured along a direction substantially perpendicular to a traveling direction of said magnetic head with respect to said magnetic recording medium during a writing operation, is greater than or equal to 0.1 nm and smaller than or equal to 5 nm; and
a ratio of said average roughness factor Ra(r) to another average roughness factor Ra(θ) of the surface of said magnetic recording medium, which is measured along a direction substantially parallel to said traveling direction of said magnetic head, is greater than or equal to 1.1 and less than or equal to 5.0.

68. A magnetic recording system as claimed in claim 57, wherein said reading portion of said magnetic head includes a magnetoresistive sensor having an alternating arrangement of a plurality of conductive magnetic layers and a conductive non-magnetic layer between each pair of successive conductive magnetic layers, and resistances of said conductive magnetic layers are changed when mutual magnetizing directions are relatively varied by an external magnetic field.

69. A magnetic recording system as claimed in claim 67, wherein the coercivity Hc(θ) measured by applying the magnetic field along the direction substantially parallel to the traveling direction of the magnetic head is greater than or equal to 1,400 Oersteds.

70. A magnetic recording system as claimed in claim 67, wherein a height of a magnetic head slider for holding said magnetic head and for floating said magnetic head with respect to said magnetic recording medium is smaller than or equal to 0.5 mm, and a thickness of said substrate is smaller than or equal to 0.6 mm.

71. A magnetic recording system as claimed in claim 67, wherein either linear recording density of said magnetic recording medium is higher than or equal to 100 kFCI, or recording track density of said magnetic recording medium is higher than or equal to 4 kTPI.

72. A magnetic recording system as claimed in claim 67, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

73. A magnetic recording system as claimed in claim 67, wherein said magnetic recording medium further comprises an underlayer on the non-magnetic substrate.

74. A magnetic recording system as claimed in claim 73, wherein said underlayer and said non-magnetic intermediate layer each contain Cr, Mo, or W as a major component, and said magnetic layers are constructed of an alloy containing Co as a major component.

75. A magnetic recording system as claimed in claim 73, wherein said underlayer, magnetic layers, and non-magnetic intermediate layer have respective Ar concentrations that are lower than or equal to 2.0 at %.

76. A magnetic recording system as claimed in claim 73, wherein said underlayer of said magnetic recording medium is constructed of at least two non-magnetic layers, and one of said at least two non-magnetic layers of said underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

77. A magnetic recording system comprising:
a magnetic recording medium;
a driving unit for driving said magnetic recording medium along a writing direction;
a magnetic head constructed of a writing portion and a reading portion;
means for relatively moving said magnetic head with respect to said magnetic recording medium; and
read/write signal processing means for reading back a signal outputted from said magnetic head;
wherein the reading portion of said magnetic head includes a magnetoresistive head;
said magnetic recording medium is arranged by a multi-layered magnetic recording medium having an alternating arrangement constituted by a plurality of magnetic layers and a non-magnetic intermediate layer between each pair of successive magnetic layers, formed on a non-magnetic substrate; and
a product (Br×t) between a total thickness (t) of said plurality of magnetic layers of said magnetic recording medium, and residual magnetic flux density (Br) of said magnetic recording medium, which is measured by applying a magnetic field along a direction substantially parallel to a traveling direction of a magnetic head with respect to said magnetic recording medium during a writing operation, is greater than or equal to 30 gauss micrometers, and also is smaller than or equal to 280 gauss micrometers.

78. A magnetic recording system as claimed in claim 77, wherein said reading portion of said magnetic head includes a magnetoresistive sensor having an alternating arrangement of a plurality of conductive magnetic layers and a conductive non-magnetic layer between each pair of successive magnetic layers, and resistances of said conductive magnetic layers are changed when mutual magnetizing directions are relatively varied by an external magnetic field.

79. A magnetic recording system as claimed in claim 77, wherein the coercivity Hc(θ) measured by applying the magnetic field along the direction substantially parallel to the traveling direction of the magnetic head is greater than or equal to 1,400 Oersteds.

80. A magnetic recording system as claimed in claim 77, wherein a height of a magnetic head slider for holding said magnetic head and for floating said magnetic head with respect to said magnetic recording medium is smaller than or equal to 0.5 mm, and a thickness of said substrate is smaller than or equal to 0.6 mm.

81. A magnetic recording system as claimed in claim 77, wherein either linear recording density of said magnetic recording medium is higher than or equal to 100 kFCI, or recording track density of said magnetic recording medium is higher than or equal to 4 kTPI.

82. A magnetic recording system as claimed in claim 77, wherein said non-magnetic substrate is selected from the group consisting of an Ni—P-plated Al alloy, surface-reinforced glass, glass, crystallized glass, Ti, carbon, Si—C, Si, glass-coated crystallized glass, ceramics, and glass-coated ceramics.

83. A magnetic recording system as claimed in claim 77, wherein said magnetic recording medium further comprises an underlayer on the non-magnetic substrate.

84. A magnetic recording system as claimed in claim 83, wherein said underlayer and said non-magnetic intermediate layer each contain Cr, Mo, or W as a major component, and said magnetic layers are constructed of an alloy containing Co as a major component.

85. A magnetic recording system as claimed in claim 83, wherein said underlayer, magnetic layers, and non-magnetic intermediate layer have respective Ar concentrations that are lower than or equal to 2.0 at %.

86. A magnetic recording system as claimed in claim 83, wherein said underlayer is constructed of at least two non-magnetic layers, and one of said at least two non-magnetic layers of said underlayer positioned on the side of said non-magnetic substrate has a composition selected from the group consisting of Zr, Si, Ti, Y, Sc, Al, C, Ge, Sb, Ga, Ru, Pd, V, Nb, Hf, Rh, Ni—P, and an alloy containing one of these materials as a major component.

87. A magnetic recording medium comprising:

a non-magnetic substrate; and an alternating arrangement constituted by a plurality of magnetic layers and a non-magnetic intermediate layer between each pair of successive magnetic layers, formed on the non-magnetic substrate;

wherein a total layer number of said magnetic layers is greater than or equal to 3 and smaller than or equal to 29; and said non-magnetic intermediate layer has a film whose thickness is greater than or equal to 0.1 nm and is smaller than or equal to 5 nm.

88. A magnetic recording medium as claimed in claim 87, wherein said total layer number of said magnetic layers is an odd number between 3 and 29 inclusive.

89. A magnetic recording system comprising:

a magnetic recording medium;

a holding member for holding said magnetic recording medium;

a magnetic recording medium driving unit coupled with said holding member;

magnetic heads arranged opposite to the respective surfaces of said magnetic recording medium;

a magnetic head driving unit for driving said magnetic head; and a read/write signal processing system for controlling said magnetic head driving unit;

wherein said magnetic recording medium is the magnetic recording medium as recited in claim 88.

90. A magnetic recording system as claimed in claim 89, wherein said magnetic head employs a a thin film as at least a portion of a writing magnetic pole, or a reading magnetic pole; and said read/write signal processing system includes a signal processing circuit by most likelihood decoding.

91. A magnetic recording system as claimed in claim 90, wherein said magnetic head includes an element for reading back a signal by utilizing a magnetoresistive effect; and said read/write signal processing system includes a circuit for correcting asymmetry existing in a waveform of a read signal.

92. A magnetic recording system comprising:

a magnetic recording medium;

a holding member for holding said magnetic recording medium;

a magnetic recording medium driving unit coupled with said holding member;

magnetic heads arranged opposite to the respective surfaces of said magnetic recording medium;

a magnetic head driving unit for driving said magnetic head; and a read/write signal processing system for controlling said magnetic head driving unit;

wherein said magnetic recording medium is the magnetic recording medium as recited in claim 78.

93. A magnetic recording system as claimed in claim 92, wherein said magnetic head employs a thin film as at least a portion of a writing magnetic pole, or a reading magnetic pole; and said read/write signal processing system includes a signal processing circuit by most likelihood decoding.

94. A magnetic recording system as claimed in claim 93, wherein said magnetic head includes an element for reading back a signal by utilizing a magnetoresistive effect; and said read/write signal processing system includes a circuit for correcting asymmetry existing in a waveform of a read signal.

* * * * *

UNITED STATES PATENT AND TRADEMARK OFFICE
CERTIFICATE OF CORRECTION

PATENT NO. : 5,723,198
DATED : March 3, 1998
INVENTOR(S) : Y. HOSOE et al

Page 1 of 6

It is certified that error appears in the above-indentified patent and that said Letters Patent is hereby corrected as shown below:

Column 1, line 22, change "to" to --on--;
    line 34, change "convention" to --conventional--;
    line 42, change "on-magnetic" to --non-magnetic--;
    line 44, change "what" to --where--;
    line 46, after "namely," insert --the--;
    line 61, change "occurred" to --occurring--; and
    line 62, change "great" to --giant--.

Column 2, line 9, change "to" to --for--;
    line 29, after "namely," insert --the-- and after "of" insert --a--;
    line 55, change "condition" to --conditions--; and
    line 63, change "a" to --as--.

Column 3, line 4, change "tion" to --tions--; and
    line 47, change "fluctuates" to --fluctuate--.

Column 5, line 2, after "containing" insert --one of--;
    line 4, delete "(substrate)";
    line 5, after "major" insert --component, and an--;
    line 6, after "containing" insert --one of--;
    line 13, after "containing" insert --one of--;
    line 18, change "are" to --is--; and
    line 47, delete "be".

Column 6, line 28, after "containing" insert --one of--.

Column 7, line 17, after "containing" insert --one of--.

Column 8, line 6, after "containing" insert --one of--;
    line 43, delete ","; and
    line 57, after "containing" insert --one of--.

UNITED STATES PATENT AND TRADEMARK OFFICE
CERTIFICATE OF CORRECTION

PATENT NO. : 5,723,198
DATED : March 3, 1998
INVENTOR(S) : Y. HOSOE et al

It is certified that error appears in the above-indentified patent and that said Letters Patent is hereby corrected as shown below:

Column 9, line 23, change "24th" to --34th--;
    line 41, change "aid" to --said--;
    line 54, after "containing" insert --one of--; and
    line 57, change "o" to --of--.

Column 10, line 66, after "containing" insert --one of--.

Column 11, line 9, delete ",".

Column 12, line 13, after "containing" insert --one of--;
    line 22, before "track" insert --medium of the 51st embodiment is higher than or equal to 100 KFCI, or the recording--; and
    line 30, delete ";".

Column 13, line 12, change "o" to --of--;
    line 15, after "embodiment" insert --is--; and
    line 22, after "containing" insert --one of--.

Column 14, line 30, after "containing" insert --one of--;
Col. 15, line 65, change "a" to --an--; and
    line 67, change "the" to --a--.

Column 16, line 16, change "o" to --of--;
    line 29, change "br" to --Br--; and
    line 53, change "therefore" to --Therefore--.

Column 17, line 19, after "equal" insert --to-- (both occurrences).

Column 18, line 8, after "for" insert --a--;
    line 21, change "have the" to --having a--;
    line 22, after "direction" insert --,--;
    line 26, change "effects" to --factors--;

UNITED STATES PATENT AND TRADEMARK OFFICE
CERTIFICATE OF CORRECTION

PATENT NO. : 5,723,198
DATED : March 3, 1998
INVENTOR(S) : Y. HOSOE et al

It is certified that error appears in the above-indentified patent and that said Letters Patent is hereby corrected as shown below:

line 49, delete "is";
    line 57, after "/" insert --Ra--; and
    line 58, change "dimension is" to --dimensions are--.

Column 19, line 7, after "containing" insert --one of--;
    line 10, after "containing" insert --one of--;
    line 18, delete ",";
    line 26, after "Mo," insert --or--;
    line 33, change "When the" to --Having an--; and
    line 35, delete "is".

Column 20, line 22, delete "probably";
    line 31, after "containing" insert --one of--;
    line 33, after "containing" insert --one of--; and
    line 64, change "Gausses" to --Gauss--.

Column 21, line 25, change "be closed," to --close--.

Column 22, line 12, delete "with";
    line 24, delete "with";
    line 31, after "having" insert --a--;
    line 33, change "the" to --a--;
    line 34, after "having" insert --a--;
    line 41, change "the" to --a--;
    line 56, change "polishing" to --polished-- and change "the" to --a--; and
    line 58, change "micron" to --micrometer--.

Column 23, line 17, change "micron" to --nm--.

Column 24, line 40, after "to" insert --the--.

UNITED STATES PATENT AND TRADEMARK OFFICE
CERTIFICATE OF CORRECTION

PATENT NO.   : 5,723,198
DATED        : March 3, 1998
INVENTOR(S)  : Y. HOSOE et al It is certified that error appears in the above-indentified patent and that said Letters Patent is hereby corrected as shown below:

Column 25, line 55, change "are" to --were--;
    line 59, delete "which are"; and
    line 63, change "contains" to --contained--.

Column 26, line 7, change "Ni-12 wt%P" to --Ni-12wt%P--;
    lines 10 and 11, change "Al-4 wt% Mg" to --Al-4wt%Mg--; and
    line 32, change "Co-16 at%Cr-4 at%Ta" to --Co-16at%Cr-4at%Ta--.

Column 27, line 21, change "is" to --was--;
    line 22, change "has been" to --was--;
    line 30, change "are" to --were--; and
    line 58, change "on/from" to --from/on--.

Column 28, line 9, change "layers" to --layer--;
    line 12, change "Co-16 at% Cr -" to --Co-16at%Cr-4at%Ta--;
    lines 14 and 15, change "C0-11 at% Cr-4 at% Ta" to --C0-11at%Cr-4at%Ta--;
    line 27, change "the" to --The--; and change "is" to --was--; and
    line 48, change "on/from" to --from/on--.

Column 29, line 12, delete ",";
    line 14, change "heat" to --head--;
    line 22, change "gauss" to --Gauss--;
    line 27, change "and a" to --was constructed. The--;
    lines 35 and 36, change "Ni-20 at% Fe" to --Ni-20at%Fe--;
    line 39, change "Ni-20 at% Fe" to --Ni-20at%Fe--;
    line 41, change "Fe-50 at% Mn" to --Fe-50at%Mn--;
    line 51, change "is" to --was--;
    line 53, change "are" to --were-- (both occurrences);
    line 54, change "so that" to --weakening--;
    line 55, delete "is";
    line 56, delete "weakened"; and
    line 57, change "becomes" to --was--.

UNITED STATES PATENT AND TRADEMARK OFFICE
CERTIFICATE OF CORRECTION

PATENT NO. : 5,723,198

DATED : March 3, 1998

INVENTOR(S) : Y. HOSOE et al

Page 5 of 6

It is certified that error appears in the above-indentified patent and that said Letters Patent is hereby corrected as shown below:

Column 30, line 6, change "Cr-10 at% Ti" to --Cr-10at%Ti--;
    line 8, change "Co-10 at% Cr-6 at% Pt" to --Co-10at%Cr-6at%Pt--;
    line 10, change "a" (second occurrence) to --and a--, and delete "Co-16";
    line 11, change "at% Cr-4 at% Ta" to --Co-16at%Cr-4at%Ta--; and
    line 48, change "on/from" to --from/on--.

Column 31, line 5, change "is" to --was--;
    line 11, change "contains" to --contained--;
    line 14, change "milligram/micron" to --mg/um--;
    line 18, change "is" to --was--; and
    line 19, change "can" to --could--;
    line 54, after "and" insert --a--;
    line 57, change "Cr-10 at%Ti" to --Cr-10at%Ti--;
    line 59, change "Co-14 at% Cr-8 at% Ni" to --Co-14at%Cr-8at%Ni--; and
    line 62, change "Co-14 at% Cr-8 at% Ni" to --Co-14at%Cr-8at%Ni--.

Column 33, line 23, change "Co-16 at % Cr-4 at % Ta" to --Co-16at%Cr-4at%Ta--;
    line 42, change "think" to --thin--;

UNITED STATES PATENT AND TRADEMARK OFFICE
CERTIFICATE OF CORRECTION

PATENT NO. : 5,723,198
DATED : March 3, 1998
INVENTOR(S) : Y. HOSOE et al

It is certified that error appears in the above-identified patent and that said Letters Patent is hereby corrected as shown below:

Col. 34, lines 14 and 15, change "Co-14at%Cr-4at%pt, Co-30at%ni-5at%pt" to --Co-14at%Cr-4at%Pt, Co-30at%Ni-5at%Pt--; and
line 48, change "than" to --that--.

Column 35, line 60, change "is" to --was--; and
line 65, change "are" to --were--.

Column 36, line 11, change "is" to --was--; and
line 64, change "lost" to --most--.

Column 37, line 15, change "lost" to --most--;
line 33, change "the stable had" to --stable head--;
line 38, change "M bits/cm$^2$" to --Mbits/cm$^2$--; and
line 39, change "M bits/cm$^2$," to --Mbits/cm$^2$, a--.

Signed and Sealed this

Thirteenth Day of October 1998

Attest:

BRUCE LEHMAN

Attesting Officer

Commissioner of Patents and Trademarks